(12) United States Patent  
Kennedy et al.

(10) Patent No.: US 8,668,124 B2  
(45) Date of Patent: Mar. 11, 2014

(54) VARIABLE WIDTH HEADACHE RACK AND ASSEMBLY WITH INTERCHANGEABLE SCREENS

(75) Inventors: Neil J. Kennedy, Woodbury, CT (US); Andrew James Hughes, New Hartford, CT (US); John Laverack, Southbury, CT (US); Douglas B. Winner, Newtown, CT (US)

(73) Assignee: Thule Sweden AB, Hillerstorp (SE)

( * ) Notice: Subject to any disclaimer, the term of this patent is extended or adjusted under 35 U.S.C. 154(b) by 369 days.

(21) Appl. No.: 12/914,728

(22) Filed: Oct. 28, 2010

(65) Prior Publication Data

US 2011/0108590 A1     May 12, 2011

Related U.S. Application Data

(60) Provisional application No. 61/257,448, filed on Nov. 2, 2009.

(51) Int. Cl.
*B60R 21/02* (2006.01)
*B60P 7/00* (2006.01)

(52) U.S. Cl.
USPC ............ 224/403; 224/402; 280/748; 296/3

(58) Field of Classification Search
USPC ............ 224/402–405, 281, 550, 551, 554; 280/748, 770; 296/3, 43
See application file for complete search history.

(56) References Cited

U.S. PATENT DOCUMENTS

| | | | |
|---|---|---|---|
| 4,611,824 A * | 9/1986 | McIntosh | 280/748 |
| 5,035,458 A * | 7/1991 | Boensch | 296/1.05 |
| 5,628,540 A | 5/1997 | James | |
| 6,557,917 B1 * | 5/2003 | Colcombe | 296/3 |
| 7,121,585 B2 * | 10/2006 | Cole | 280/748 |
| 7,571,952 B1 * | 8/2009 | Hamaguchi et al. | 296/183.2 |
| 2003/0011180 A1 * | 1/2003 | Coffman et al. | 280/748 |
| 2005/0052055 A1 | 3/2005 | Cole | |
| 2005/0093320 A1 * | 5/2005 | Brauer et al. | 296/3 |

OTHER PUBLICATIONS

Canadian Intellectual Property Office, Office Action dated Oct. 30, 2012 for corresponding Canadian Patent Application No. 2,719,592, 4 pgs.

* cited by examiner

*Primary Examiner* — Brian D Nash
*Assistant Examiner* — Corey Skurdal
(74) *Attorney, Agent, or Firm* — Novak Druce Connolly Bove + Quigg LLP

(57) ABSTRACT

An adjustable width headache rack capable of accommodating the widths of multiple pick-up truck vehicles and mounting thereon including a frame member having an upper load bar and a lower cross bar each extending between two upright members spaced a distance from one another. Leg members extend from each upright member in a rearward direction on top of bed rails of the pick-up truck. The leg members have a sleeve portion which slidingly engages the lower cross bar thereby enabling width adjustment. Screen members are interchangeable within the truck rack frame.

20 Claims, 25 Drawing Sheets

VARIABLE WIDTH HEADACHE RACK AND ASSEMBLY WITH INTERCHANGEABLE SCREENS

CROSS REFERENCE TO RELATED APPLICATIONS

This is application claims priority to provisional Application No. 61/257,448, filed Nov. 2, 2009, the disclosure of which is hereby incorporated by reference in its entirety.

TECHNICAL FIELD

The present application generally relates to headache racks for load carrying vehicles such as pick up trucks. The headache racks provide for variable width in order to accommodate the widths of multiple vehicles and mount onto the sidewalls thereof. Additionally, interchangeable screen members for protection of the cab are also provided.

BACKGROUND

The use of headache racks has become increasingly prominent for pick up trucks and load bearing vehicles especially with relation to carrying out work and transporting large items, thereby obtaining the full benefits of such vehicles. Headache racks are generally located immediately behind the cabin of a pickup truck and generally have a raised cross bar capable of bearing a load such as a ladder, or wood beams or other object. Often times such cross bars are utilized as a cantilever when such objects are placed in the bed of a pick up truck.

Headache racks often times employ a screen of some type beneath the cross bar for protection of passengers therein. Generally, pick-up trucks have a window located in the rear portion of the cab and thus some type of protection may be considered for preventing articles contained in the bed of the truck from lurching forward as a projectile and passing through the window upon sudden stop. Such may be the historical cause that gave rise to the term "headache rack" as by protective screens welded to the rack and positioned in front of the rear cab window articles can be stopped from passing through and causing "headaches" or severe injury to the passengers within. Usually the screens which are part of the rack are less for show and more for protection, however, some may be designed to have at least in part ornamental purposes.

In the past, screens have been welded and permanently integrated with the rack, allowing no adaptability and rendering the owner of the vehicle unable to change screens without replacing the entire rack. Moreover, throughout the industry racks have heretofore been vehicle specific. Different brands of pick-up truck vehicles each have their own specific dimensions, widths and proportions. As headache racks have most of the component parts welded together, once a rack is made, its dimensions are set and thus only fit the particular vehicle brands they are designed for. This lack of flexibility sets a rigid boundary on owner of a vehicles regarding which racks they may buy and what they may do with them. What is needed therefore is a headache rack that allows adaptability and greater flexibility and functionality for the pick-up truck vehicle owner.

SUMMARY

The present disclosure in its several embodiments alleviates the drawbacks described above with respect to the inflexibility of previous headaches, and thus enables a user to vary the width of a headache rack to accommodate multiple pick-up truck vehicles. Additionally the racks of the present disclosure provide in several embodiments for the interchangeability of multiple screens. Accordingly, advantages of the several embodiments of the truck racks disclosed herein include its adaptability to multiple vehicles having different proportions and dimensions as well as the changing of screens at the leisure of the user. Thus the racks as disclosed herein make it very convenient and easy for fitting to a pick-up truck vehicle. Furthermore, another advantage is for dealers and retailers which now can sell one type of variable width rack instead of carrying multiple racks, and furthermore may sell the component parts.

Several embodiments provide for an adjustable width headache rack located behind the cab of a pickup truck for bearing loads, the rack being adjustable to accommodate the widths of multiple pick up truck vehicles, and includes a frame member having an upper portion and lower portion, with the upper portion having an upper load bar and the lower base portion having a lower cross bar, the lower and upper cross bars each extending horizontally between two upright members; the upright members being spaced a distance from one another and extending essentially perpendicular to the bed of the pick up truck; the lower portion of the frame having a leg member located on each end of the frame extending in the rearward direction of a pickup truck and arranged to rest atop bed rails of a pick up truck, and the leg members having a portion slidably engaged with the base portion of the frame, whereby the leg members are moveable inward and outward corresponding to the sliding of the portion along the length of the base portion for adjustment of the width of the frame to accommodate the varying widths of multiple pickup trucks.

In other embodiments, the leg members can further have a sleeve portion which slides along the lower cross bar on an outside portion thereof and partially or fully encloses the cross bar.

In further embodiments the leg members have stake pocket mounts for being received by a stake pocket in the bed rails of the truck. The leg members can have an elongate slot along the longitudinal length of the leg member whereby the stake pocket mount may be fastened in multiple positions for accommodating varying stake pocket positions of multiple pickup trucks.

In other embodiments, the upright members have fastening apertures for removably inserting multiple protective screen members.

Other embodiments include a width adjustable headache rack in the form of an assembly kit for being located behind the cab of a pickup truck for interchanging a plurality of screen members, the rack including a frame member having an upper portion and lower portion, with the upper portion having an upper load bar and the lower base portion having a lower cross bar, the lower and upper cross bars each extending horizontally between two upright members, the upright members being spaced a distance from one another and extending essentially perpendicular to the bed of the pick up truck, a plurality of screen members shaped for being arranged between and connected with the upright members, the plurality of screen members each being removably mountable between the upright members.

In further embodiments the upright members have fastening apertures for fastening the plurality of screen members to the upright members. Furthermore, the kit can include spacer mounting blocks for fastening between the upright members and the screen members when screen members are mounted between the upright members.

The plurality of screen members can include a mesh screen, high visibility screen, and louver screen.

Other embodiments include a full headache rack for interchanging a plurality of screen members is disclosed, the rack including a frame member having an upper portion and lower portion, with the upper portion having an upper load bar, the upper cross bar extending horizontally between two upright members, the upright members being spaced a distance from one another and extending essentially perpendicular to the bed of the pick up truck, leg members each attached to the upright members and extending therebetween in the same longitudinal direction of the upper cross bar, the leg members configured for removably mounting a screen member thereon. In further embodiments the full headache rack includes attachment clamps extending from the screen member to the upper portion of the rack.

BRIEF DESCRIPTION OF THE DRAWINGS

The invention will now be described in greater detail in the following by way of example only and with reference to the attached drawings, in which.

DETAILED DESCRIPTION OF THE INVENTION

As required, detailed description of embodiments of the present invention are disclosed herein; however, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
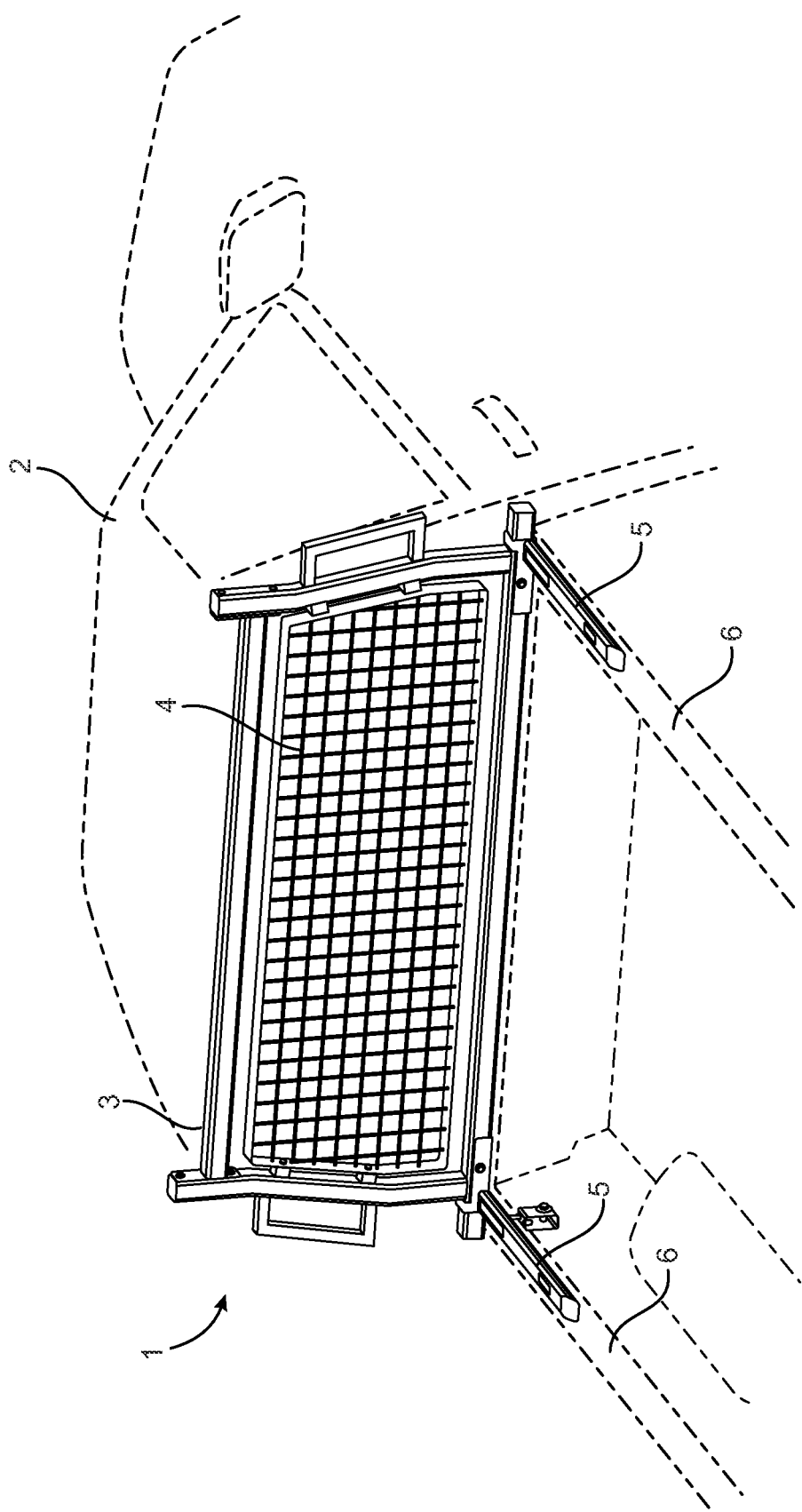
FIG. 1 is a perspective view of one embodiment of a variable width headache rack on a pick-up truck vehicle.
Figure 2:
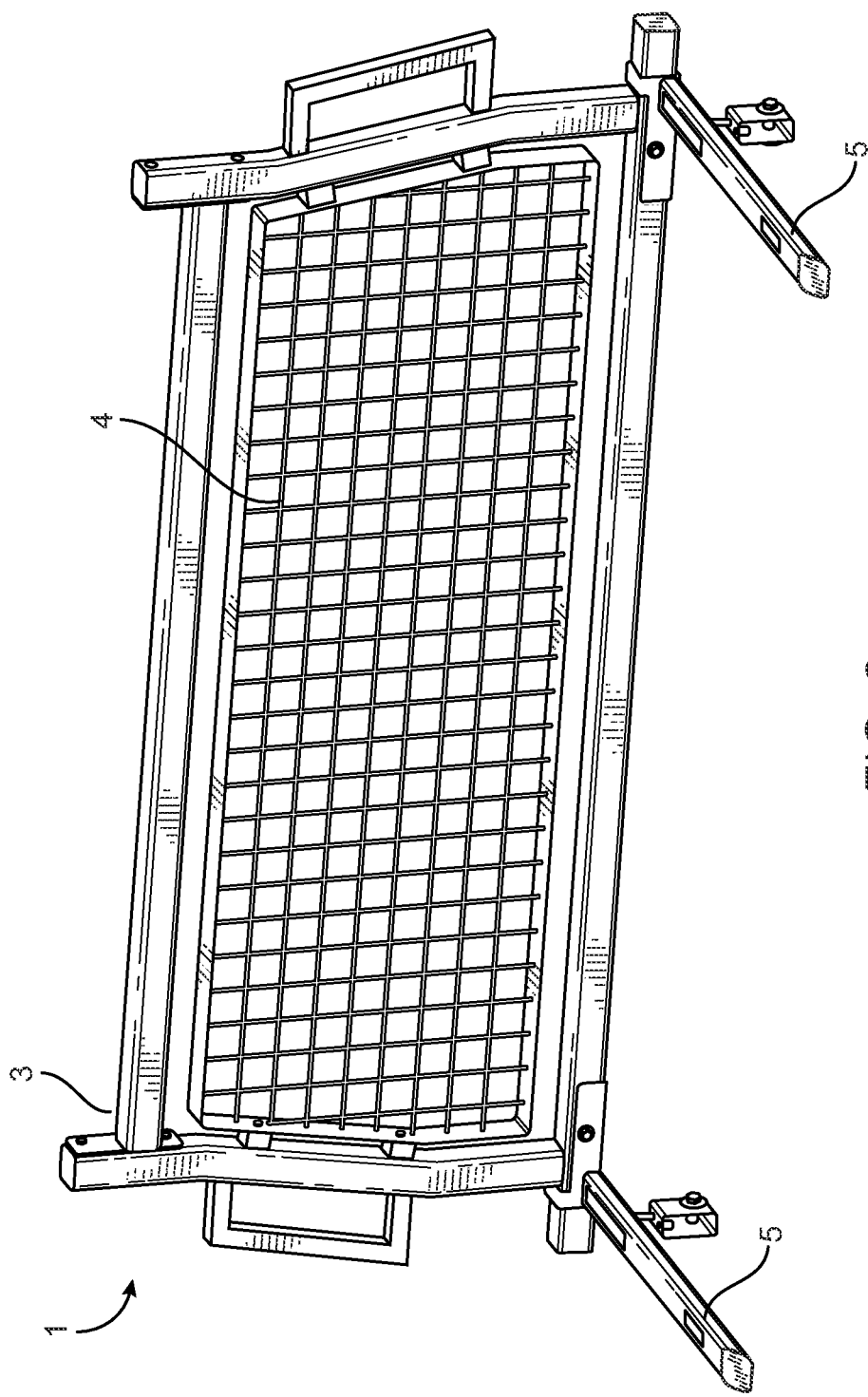
FIG. 2. is a perspective view of one embodiment of a variable width headache rack.

Referring to the Figures, one exemplary embodiment of an adjustable width headache rack 1 is illustrated in FIG. 1 which is located or mounted immediately behind the cab of a pick-up truck. 2. As shown in FIG. 2, the headache rack 1 is made up of a rack frame 3 within which various types of screens can be mounted, and in the depicted embodiment, a screen mesh member 4 is mounted in the rack. The screen member 4 of the mesh type is one of the more protective screens, having multiple rows of metal running vertically as well as horizontally. Screens of this type, because of the high number of metal rows are more able to block objects which may act as projectiles upon stopping of the vehicle. Furthermore, generally the rack 1 is made up of a strong durable materials, such as metals, composites, or steel.

Also, in FIG. 1 are shown leg members 5 which extend from a lower portion of the rack 1 in a rearward direction toward the back of the pick-up truck. The leg members 5 rest on top of the bed rails 6 of the pick-up truck thereby stabilizing the rack 1 when mounted on the truck.

Figure 3:
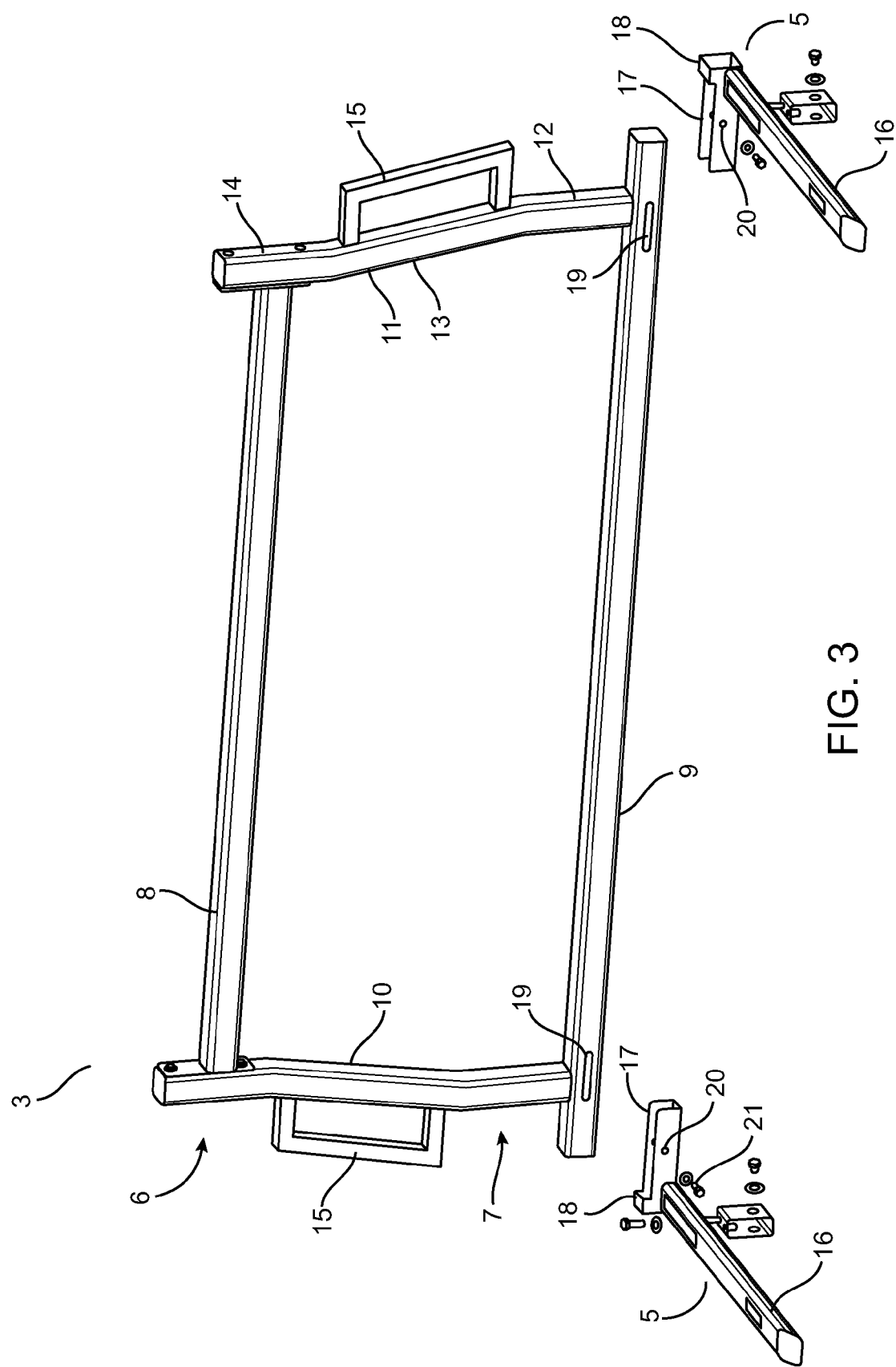
FIG. 3 is a perspective view of one embodiment of a variable width headache rack frame with a screen member removed.

Referring now to FIG. 3 a disassembled rack frame 3 is illustrated with the screen member removed and having a top portion 6 located generally toward the upper part of the rack frame 3 and a lower portion 7 located generally toward the lower part of the frame 3. An upper load bar 8, which may also be term the upper cross bar, is arranged in the upper portion of frame 3. The upper load bar 8 is positioned toward the top of the frame for receiving loads thereon. A lower cross bar 9 is arranged in the lower portion of the rack frame 3, and in the embodiment shown in FIG. 3 it is in the bottom thereby forming the base of the rack frame.

Two upright members 10 and 11 are arranged on each side of the rack spaced a distance from one another. The upright members 10 and 11 extend vertically, essentially perpendicular to the base of the truck bed. The upright members provide support for the upper load bar 8. As shown in FIG. 3, the upright members indent toward one another, such that they can be described as having a first section 12, a diagonal section 13 which is directed inward, and a top section 14 which is parallel to the first section 12 but is shifted toward the center of the rack. In other embodiments, the upright members may be completely straight, or may be curved or arched inward or outward toward the centerline portion of the vehicle, or may be curved or arched frontward or backward.

Additionally, handles 15 may be attached on the outer sides of the upright members. Such handles 15 allow a user to an easy and convenient way to access the truck bed or a tool box contained in the truck bed by grasping the handles as a means of support.

The upper load bar 8 extends between the two upright members 10 and 11. Furthermore, as the upright members 10 and 11 are attached to and extend from the lower cross bar 9, the lower cross bar 9 extends between the two upright members and slightly beyond. In the embodiment shown in FIG. 2, the lower cross bar extends about as far as the handles 15 extend on each side from the upright members.

Also depicted in FIG. 3 are leg members 5 which extend in a rearward direction relative to the vehicle. As shown in FIG. 1 these will be mounted on top of the bedrails of the pick-up truck. The leg members 5 have a forward extension member 16 and a sleeve portion 17. The sleeve portion 17 has a bottom surface with two side walls extending upward therefrom. Furthermore, on the outer end, the sleeve portion may have a cover 18 thereby encircling any member inserted therein. The sleeve portion 17 slidably engages the lower cross bar 9 and is moveable inward and outward thereon. Accordingly, the sleeve portion 17 will encompass the cross bar 9 when inserted onto the bar. With the cover 18 on the sleeve portion, the sleeve fully encircles the cross bar. In other embodiments, the sleeve need not have a cover 18 or encircle the cross bar, but may have one or two sidewalls for slidingly receiving the cross bar 9.

As further depicted FIG. 3 is an elongate slot 19 on the rear side of the cross bar 9. The elongate slot 19 extends in the longitudinal direction. A fastening hole 20 is located on the sleeve portion 17. When sleeve portion 17 is inserted onto the cross bar 9, the elongate slot 19 and fastening hole 20 correspond such that fastener 21 can be inserted through both the elongate slot 19 and fastening hole 20. Accordingly, when the fastener 21 is loosened, the sleeve can slide along the length of cross bar 9 to the extent allowed by the length of the elongate slot 19. The sleeve can then be locked in place along the length of the cross bar 9 by tightening the fastener 21.

Figure 4:
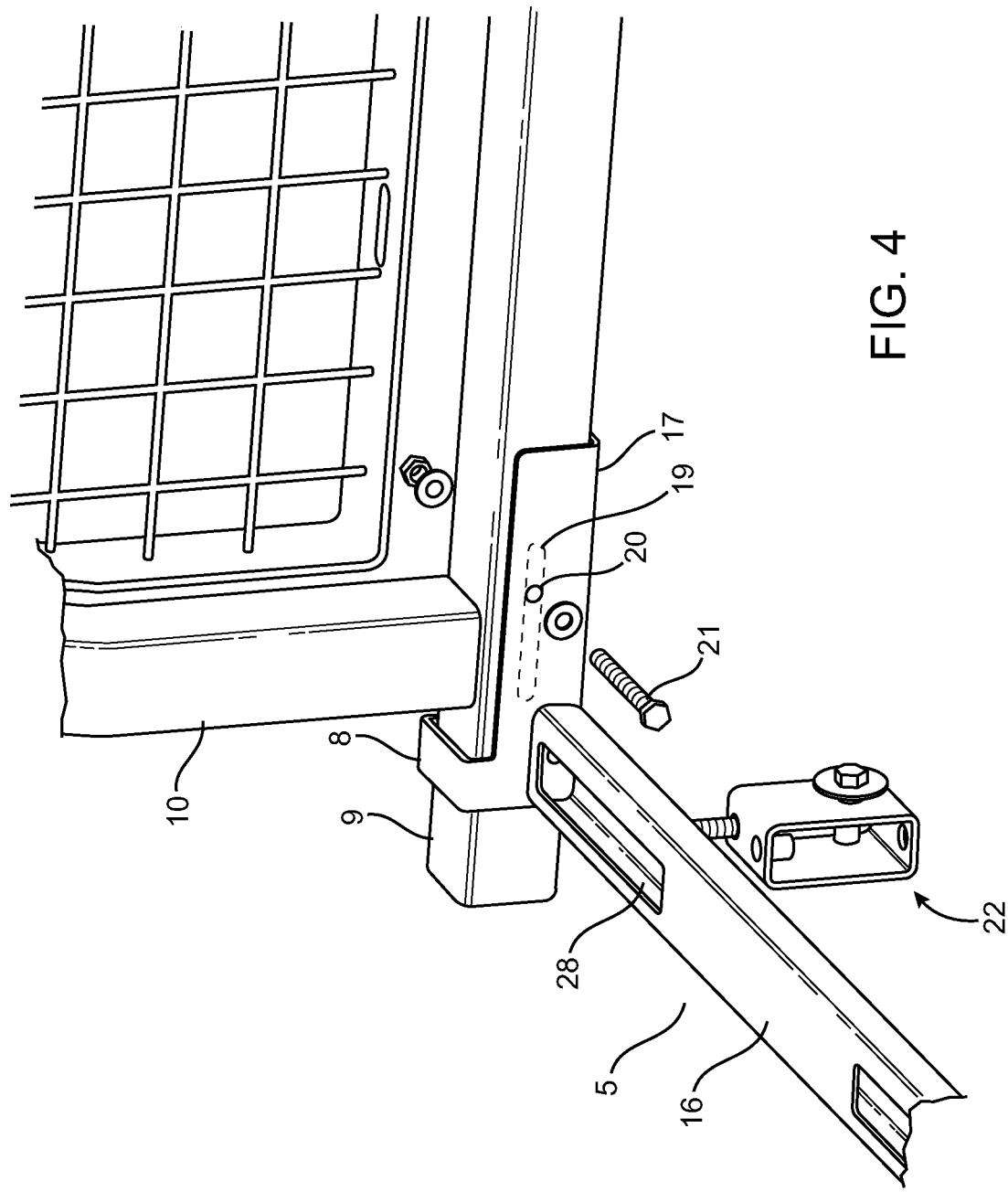
FIG. 4 is a perspective view of one embodiment of a variable width headache rack leg member.
Figure 4A:
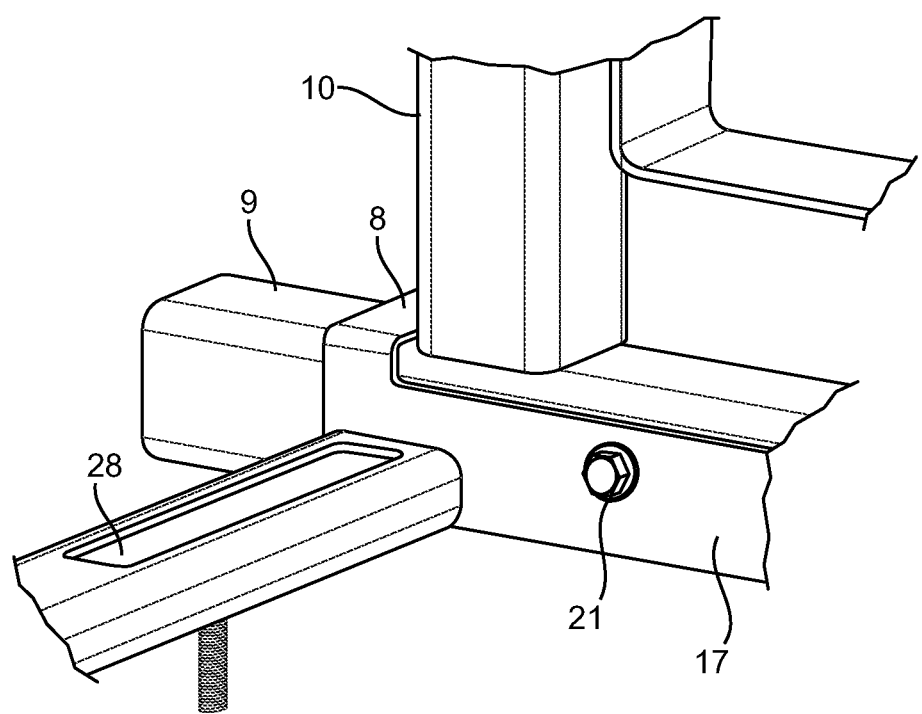
FIG. 4a is a perspective view of one embodiment of a variable width headache rack leg member.

The alignment of the fastening hole 20 and elongate slot 19 is illustrated in FIG. 4. There, the sleeve portion 17 has been inserted over the cross bar 9 and the fastening hole 20 is positioned to correspond to the elongate slot 19. Furthermore, the cover 8 of the sleeve is shown, and make act as a blocker and abut against the upright member 10 preventing the sleeve portion 17 from sliding too far inward along the cross bar 9. In FIG. 4, elongate slot 19 is shown behind sleeve portion 17 for illustrative purposes, but however, will be hidden from view from a User as illustrated in FIG. 4a.

Therefore, in view of the above the width of the legs on the rack 1 may be adjusted in and out to accommodate any desired width. Accordingly, for a pick-up truck with wide bed rails, an operator may loosen the fastener 21 and slide the sleeve portion 17 outward and align the leg members 5 with the top of the bed rail. For a pick-up truck with narrower bed rails, a user would loosen the fastener 21 and slide the sleeve portion 17 inward along the length of the lower cross bar 9 to align the leg members 5 with the end rails. In this way the width of the headache rack 1 can be adjusted wider or narrower to accommodate the width of whatever pick-up truck it is being mounted to. Accordingly, the specific brand or dimensions of the truck are not limiting. A user has flexibility to use the adjustable width headache rack with a multitude of different pick-up truck brands and designs instead of in the past being limited to selecting the headache rack made for a specific brand or type of pick-up truck.

Figure 5:
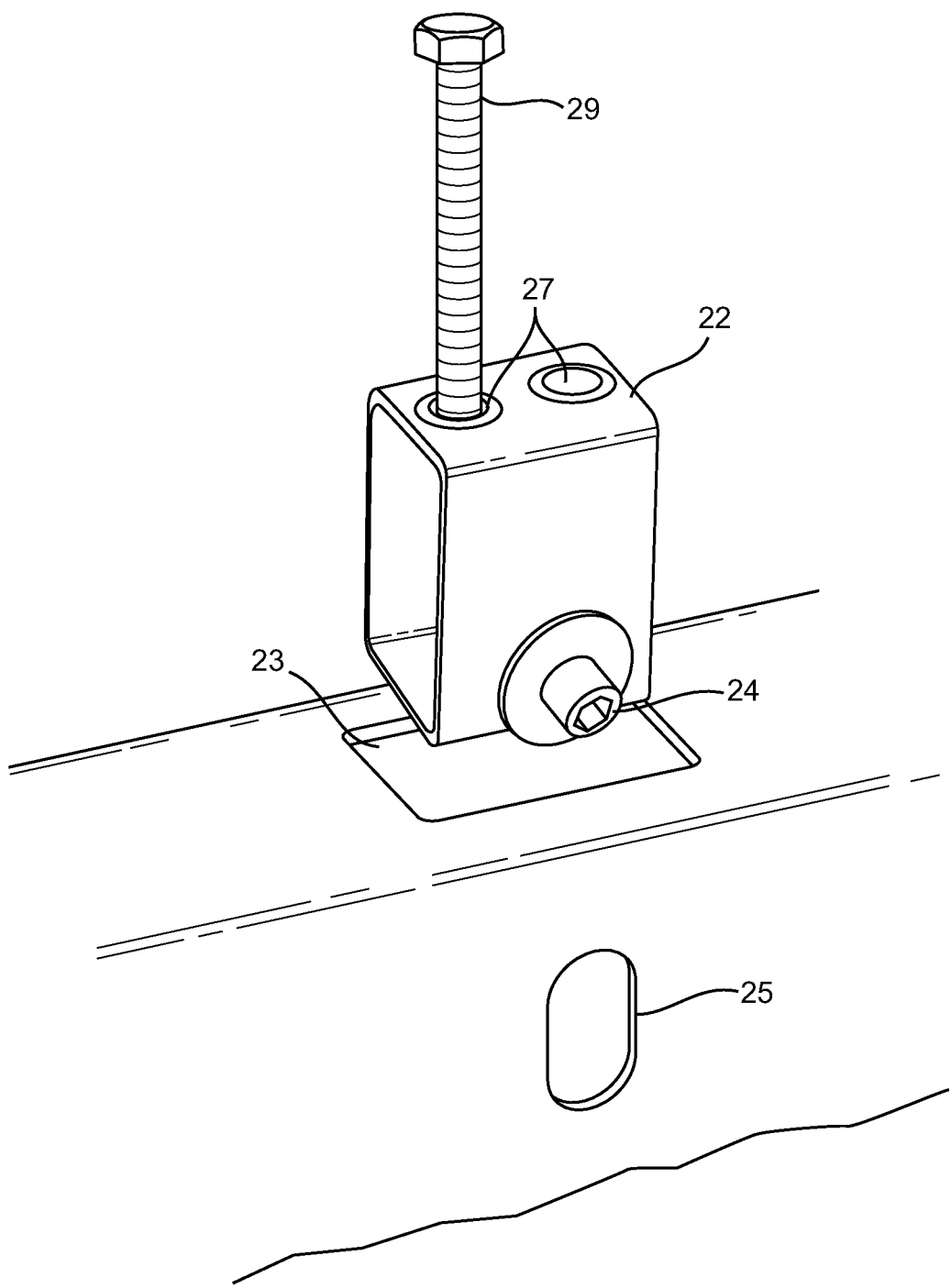
FIG. 5 is a perspective view of one embodiment of a stake pocket and stake pocket mount.
Figure 6:
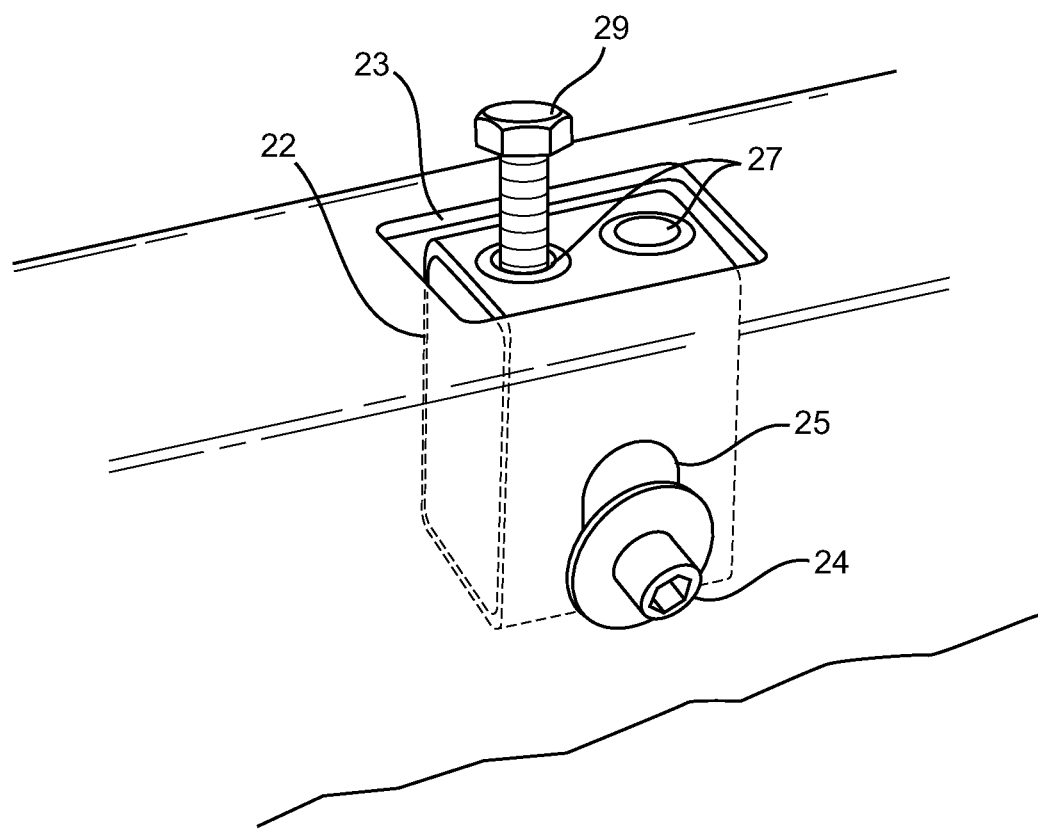
FIG. 6 is a perspective view of one embodiment of a stake pocket mount inserted into a stake pocket.
Figure 7:
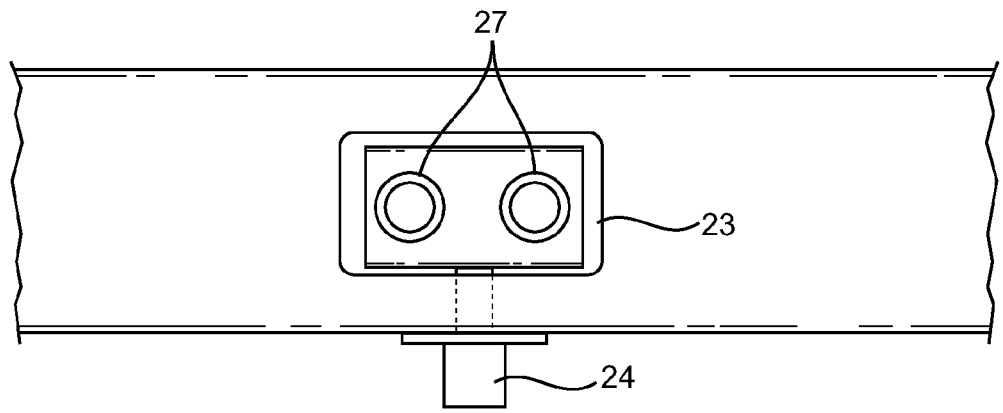
FIG. 7 is a top plan view of one embodiment of a stake pocket mount inserted into a stake pocket.
Figure 8:
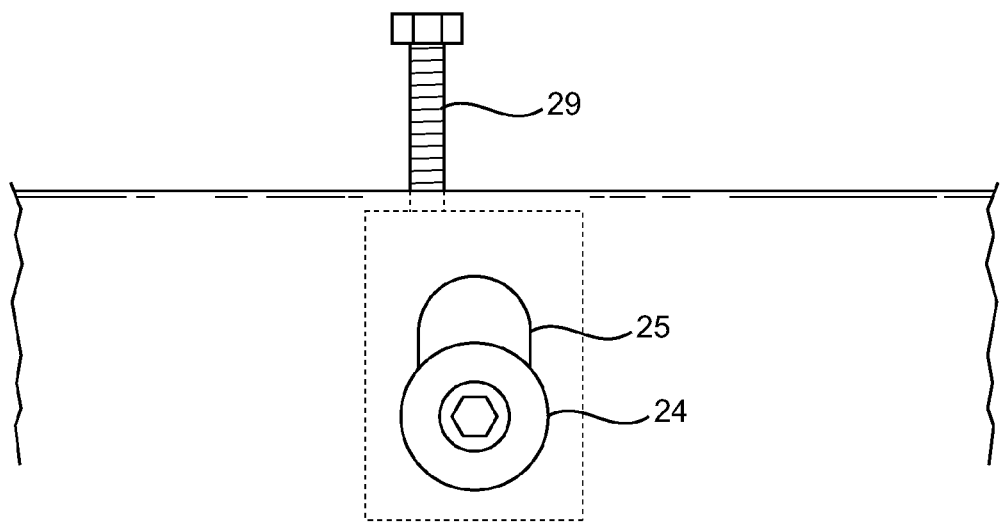
FIG. 8 is a side elevational view of one embodiment of a stake pocket mount inserted into a stake pocket.

An additional adjustment mechanism is provided on the forward extension member 16. Shown in FIG. 5 is a stake pocket mount 22 which can be used to mount the rack 1 onto the pick-up truck. Generally, pick-up trucks have a stake pocket 23 on the top of the bed rail, which is usually an aperture. If there is not already a stake pocket, an owner of a pick-up truck may cut a hole in the top of the bed rail to serve as a stake pocket. A stake pocket mount 22 is shown having a general rectangular cube configuration with a top and bottom, and two sides, and two sides which are openings. The top of the stake pocket mount 22 has two apertures which may have threading to receive a bolt. Once the stake pocket mount 22 is inserted into the stake pocket 23, as shown in FIGS. 6-8, a fastener 24 can be inserted through sidewall hole 25 in the bed rail into the stake pocket mount 22 for securement therein. When the fastener 24 is tightened, the stock pocket mount 22 will then be secured in the stake pocket 22 as shown in FIGS. 6-8.

With the stake pocket mount 22 secured in the stake pocket 23 as shown in FIGS. 6-8, the two apertures 27 are easily accessible as depicted in FIG. 7. The forward extension member 16 has an elongate slot 28 extending in the longitudinal direction and which can be aligned with the stake pocket 22. A fastener 29 can be inserted through both the elongate slot 28 and stake pocket 23 and tightened to secure a leg member 5 thereon. Due to the length of the elongate slot 28, the mounting of the leg members 5 are not limited by the brand or design of the truck. If a stake mount pocket on a bed rail is close to the cab or further away, in either case, the elongate slot 28 can still be aligned with the stake pocket 23 for mounting thereon. Such adjustability provides greater freedom in mounting the rack 1 on a plurality of differently designed and dimensioned pick up trucks.

Figure 9:
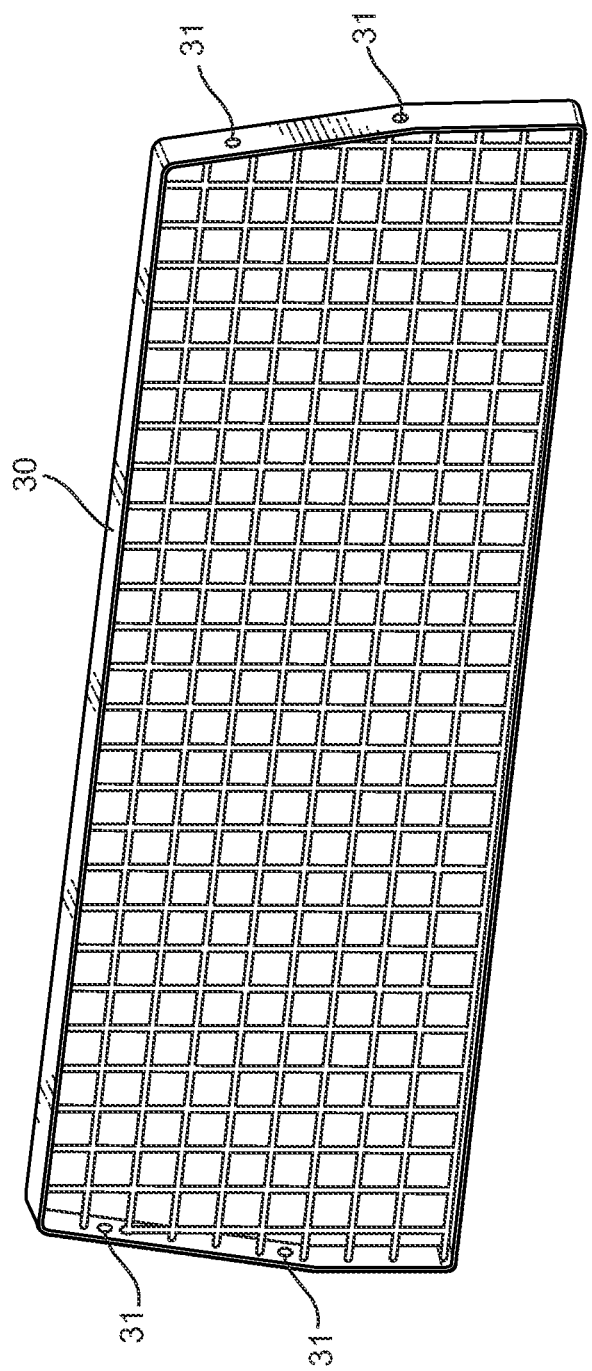
FIG. 9 is a perspective view of one embodiment of a mesh screen member.
Figure 10:
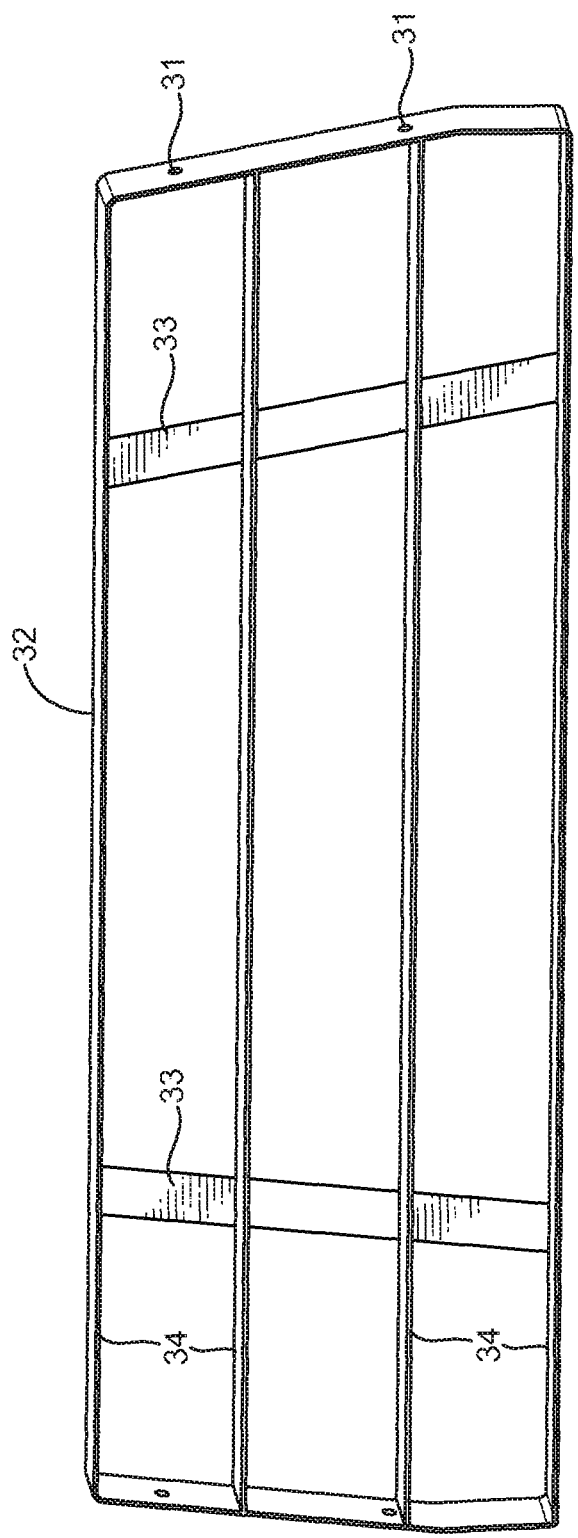
FIG. 10 is a perspective view of one embodiment of a high visibility screen member.
Figure 11:
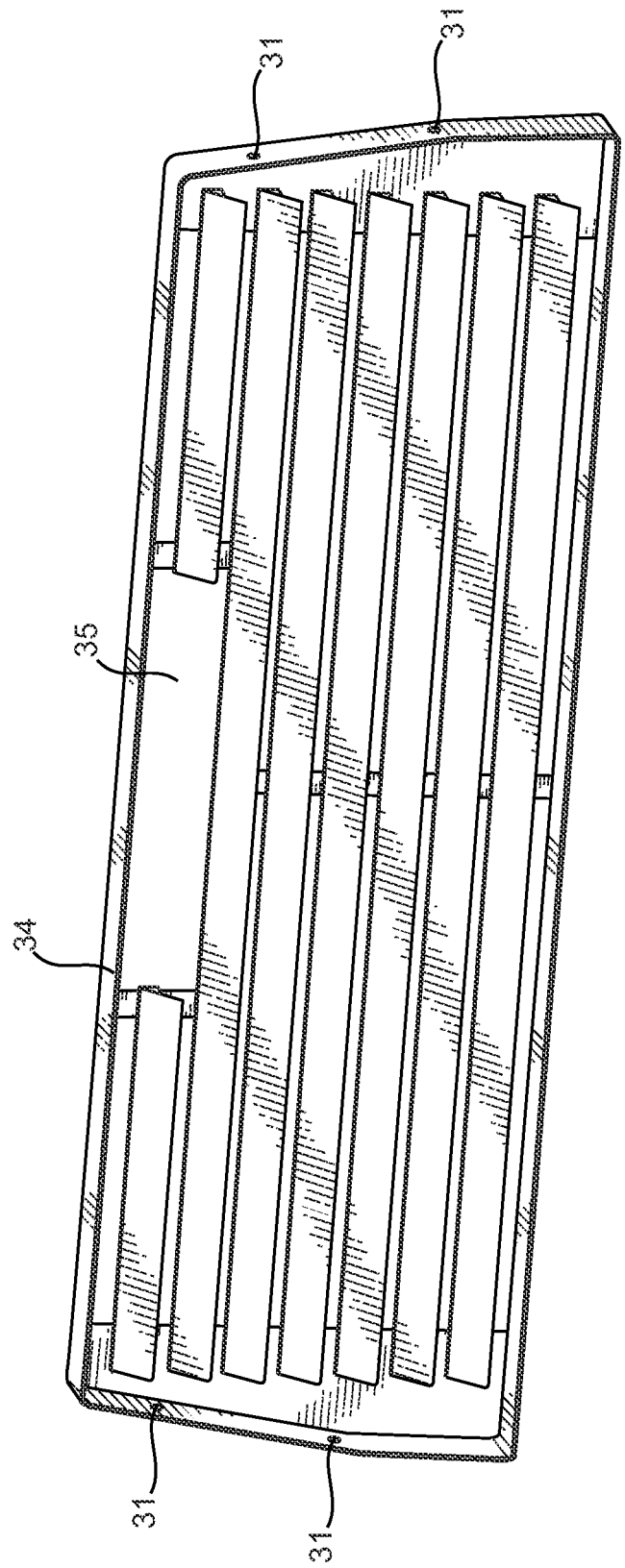
FIG. 11 is a perspective view of one embodiment of a louver screen member.

In additional embodiments, the screen members can be removeably inserted into the rack frame 3. Therefore, a user can insert a screen and interchange it with another depending on whatever is most suitable for the occasion. FIGS. 9-11 display several types of screens which may be interchanged in the rack frame 3. In FIG. 9 is shown a mesh screen member 30. As can be seen, the mesh screen member is generally rectangular with each side inclined inward slightly such that the top portion of the mesh member 30 is shorter in length than the bottom portion. The screen member also has spacer block apertures 31 for fastening two spacer blocks on each side for mounting the screen members onto the rack 3 (described in more detail below). The mesh member type has a large number of vertical and horizontal rows for greater protection of the pick-up truck cab. However, at the same time because of the greater number of rows, there is lower visibility.

Accordingly, other screens may be employed, for example, the high visibility screen member 32 as shown in FIG. 10. As shown high visibility screen member 32 has an outer frame with the two vertical members 33 inclining slightly. Furthermore, there are four horizontal members 34 that are essentially parallel to the bed of the pick-up truck. As there are fewer cross members than the screen mesh member 30, it is easier for a driver of the pick-up truck to see through the high visibility screen 32, but however, a degree of safety is sacrificed, as larger objects may potentially pass between the horizontal and vertical members 32 and 33.

Another screen which may be interchanged is the louver screen 34 depicted in FIG. 11. As shown in FIG. 11 the louver screen 34 has several horizontal cross-members 35 which are angled to prevent entry of particulates and better clear rain. In other embodiments the louver screen members 35 can extend rearward fully horizontal without angle.

Although three types of screens are disclosed and described herein, those of skill in the art would understand that there are numerous types of screens which can be interchanged with the rack frame disclosed herein.

Figure 12:
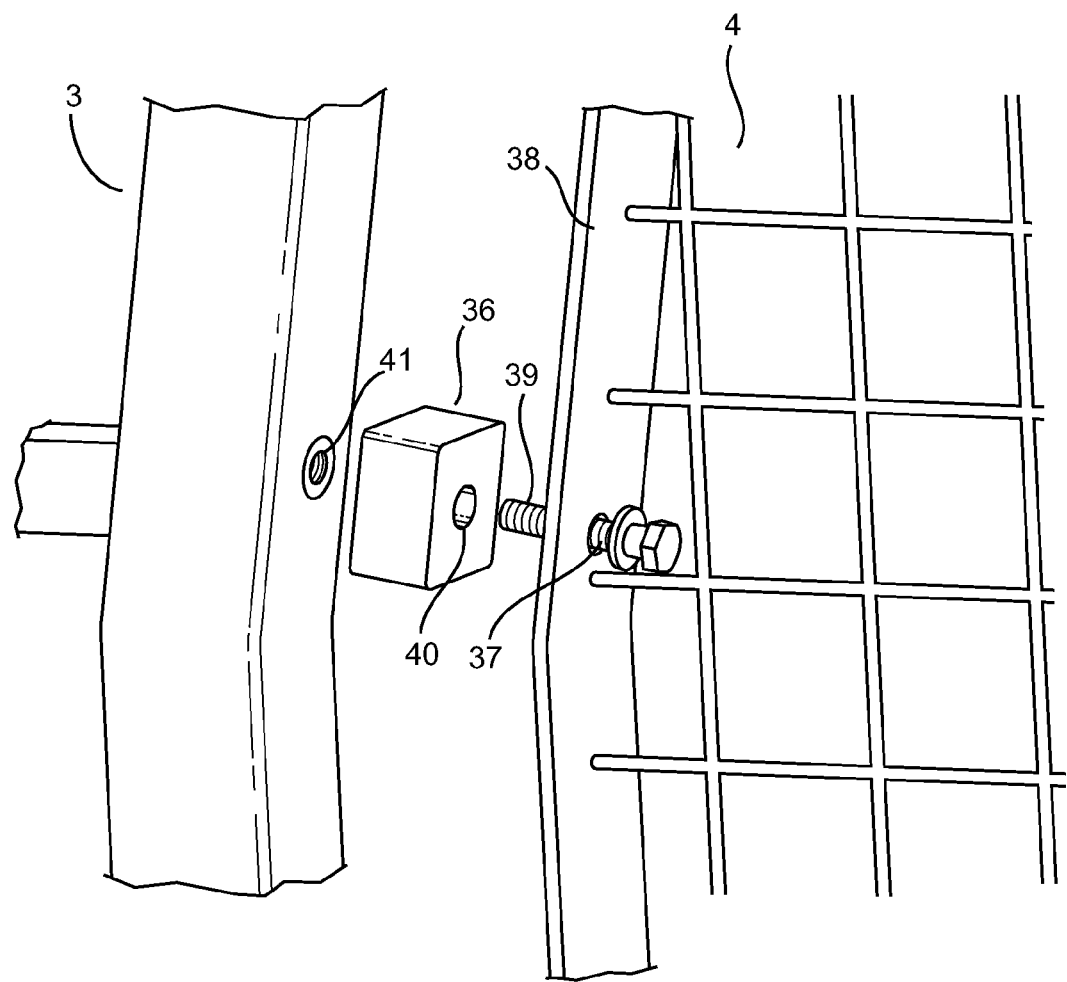
FIG. 12 is a perspective view of one embodiment of a spacer block and component parts for mounting a screen member to a rack frame.

Referring now to FIG. 12, as shown therein are component parts for mounting screen members onto the rack frame 3. For mounting a spacer block 36 is positioned between the rack frame 3 and the screen member 4 (in this embodiment a mesh screen is shown, however other screens may be used). The spacer block 36 is in the shape of a cube and provides a distance between the rack 3 and screen member 4. It will be understood that the spacer block can have other shapes, such as round, rectangular, oval, and facilitates mounting of the screen member 4. An aperture 37 is placed through the outer rim 38 of the screen member 4 for receiving a fastener 39. The spacer aperture 40 can be aligned with the outer rim aperture 37 and an aperture 41 on the inside surface of the rack frame 3. Then the fastener 39 can be tightened into the aligned apertures to mount the screen member 4 into the rack frame 3. As can be observed in FIGS. 9-11, there may be employed four spacer blocks 40, with two on each side. It will be understood that any number of mounts may be used to secure the screen members onto the rack frames, as long as it is sufficient to stabilize the screens therein. Furthermore, such spacer blocks can be fastened onto the screens prior to mounting to the rack frame 3 as shown in FIGS. 9-11.

In this manner, a user can remove one screen, such as a mesh screen as shown in FIG. 9, and replace it with another screen, such as those in FIG. 10 or 11. By removing the fastener and the spacer blocks, the screens can be removed and a new one inserted. This adds another dimension of flexibility to an owner of a pickup truck. Not only may the width be adapted to the dimensions of the truck, but also the screens may be replaceably interchanged.

Figure 13:
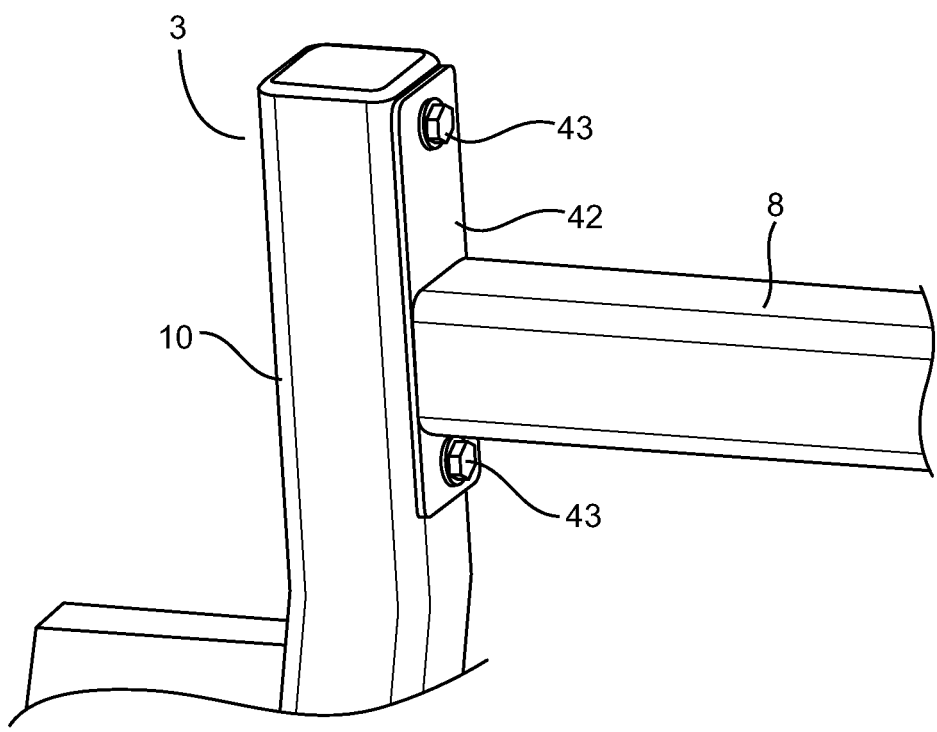
FIG. 13 is one embodiment of an upper load bar in a low configuration.
Figure 14:
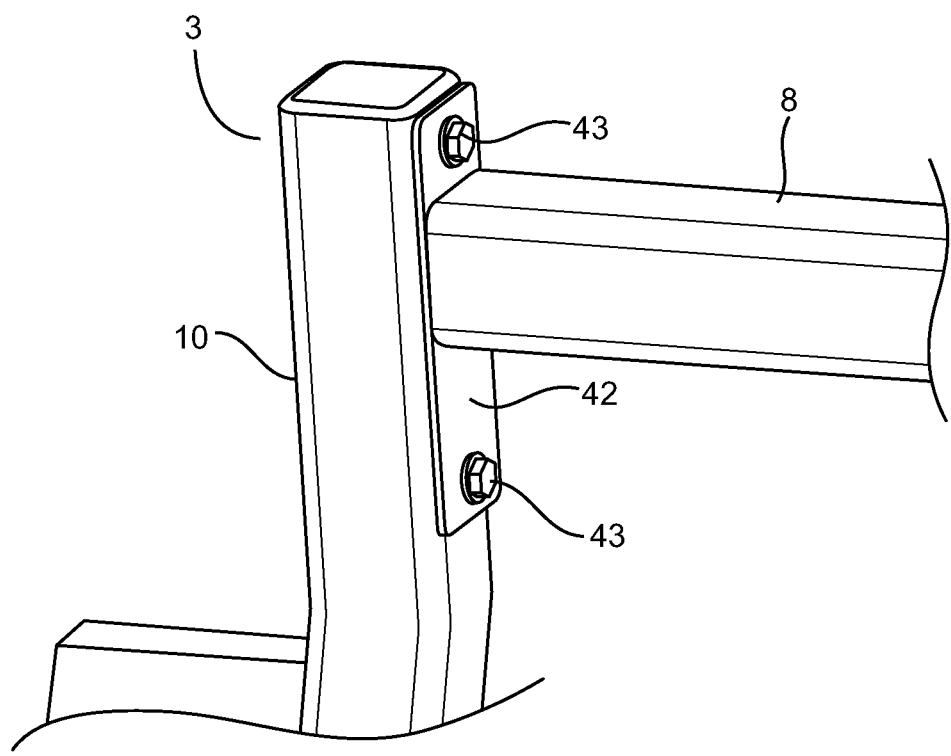
FIG. 14 is one embodiment of an upper load bar in a high configuration.

FIGS. 13 and 14 illustrate two configurations for the upper load bar 8 on the rack 3. For added flexibility, upper load bar 8 may have a low configuration as shown in FIG. 13 (as well as FIGS. 1-3) and a high configuration as shown in FIG. 14. As illustrated in FIGS. 13 and 14, the upper load bar 8 is attached to an end piece 42 which has a generally rectangular shape. However, upper load bar 8 is attached closer to one end of the end piece 42. Accordingly, when attached as shown in FIG. 13, the upper load bar 8 will be in a low configuration. By removing the fasteners 43, the upper load bar 8 can then be flipped 180 degrees and refastened therefore placing the upper load bar 8 in the higher configuration shown in FIG. 14.

Figure 15:
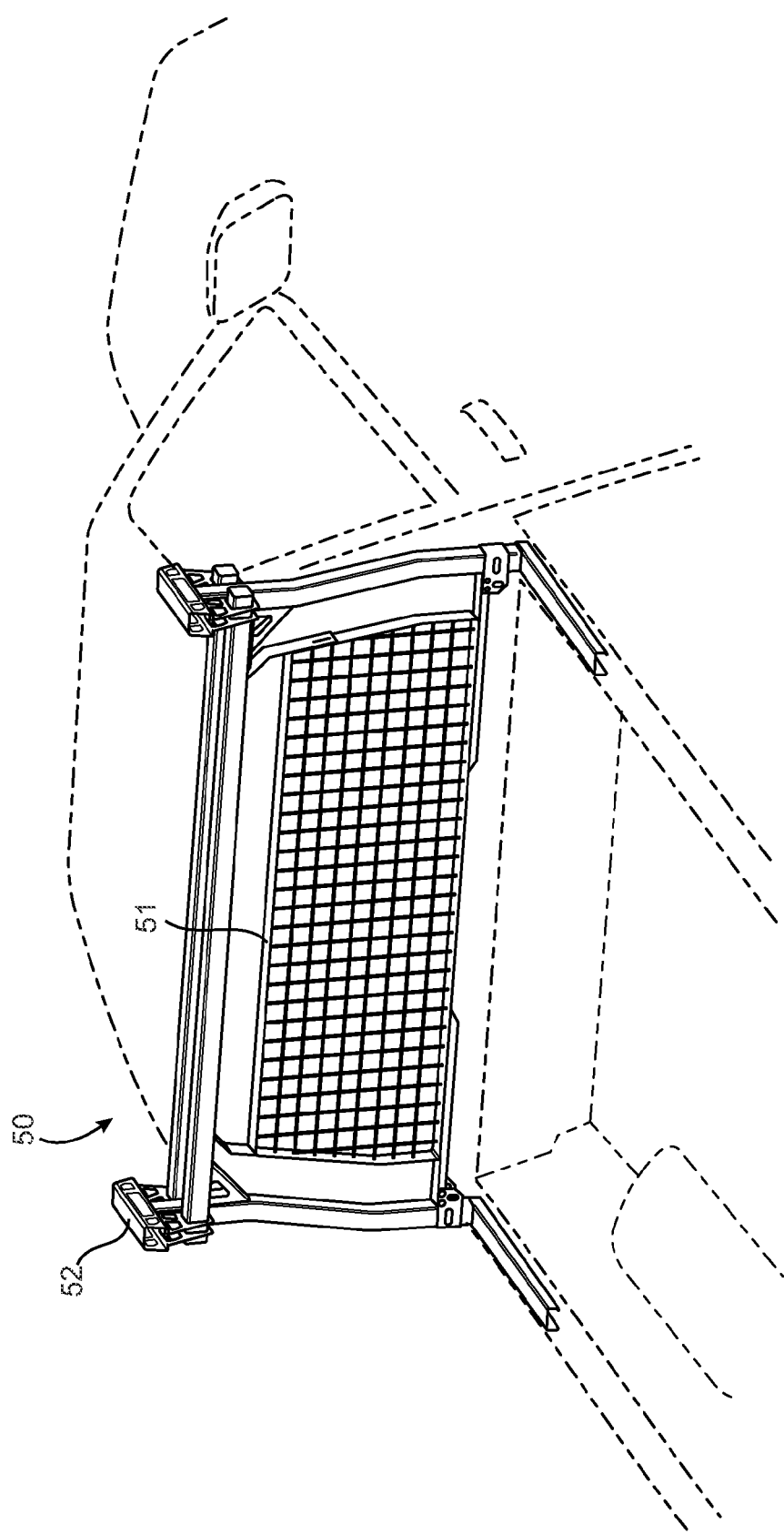
FIG. 15 is a perspective view of one embodiment of a full truck rack for interchanging screen members.
Figure 16:
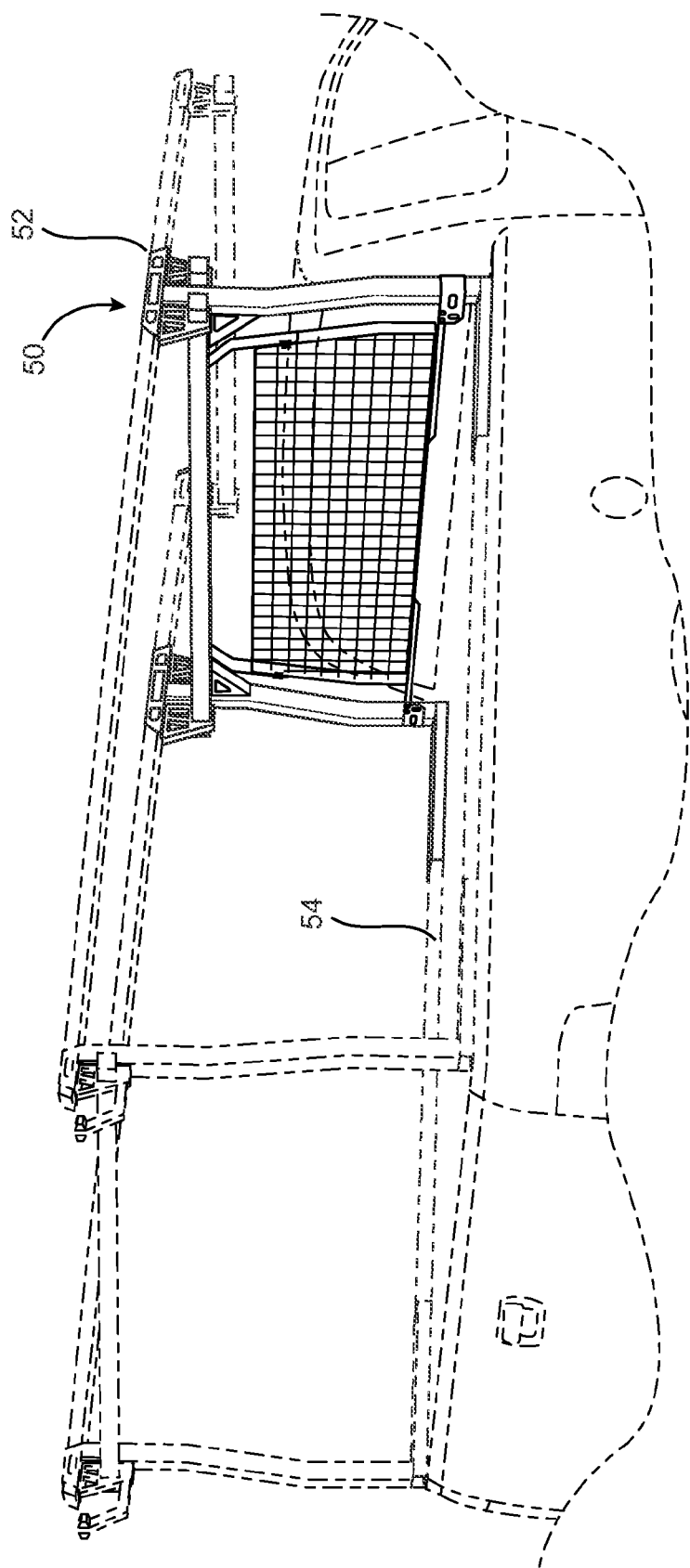
FIG. 16 is a perspective view one embodiment of a full truck rack for interchanging screen members.

In another embodiment, a portion of a full truck rack for a pick-up truck is shown in FIGS. 15-16 which for simplicity can be referred to as the truck rack screen mount 50. Similarly to the headache rack shown in FIG. 1, the portion of the full truck rack shown in FIG. 10 is mounted such that the screen member 51 is mounted just behind the cab of a truck window. Any of the screens as shown in FIGS. 9-11 may be inserted therein and removed at the leisure of the user of the vehicle. As shown in FIG. 16 are upper brackets 52 through which upper support bars 53 may pass. Furthermore, lower support bars 54 which form the base of the rack may extend in the rearward direction on top of the bed rails of a pick up truck.

Figure 17:
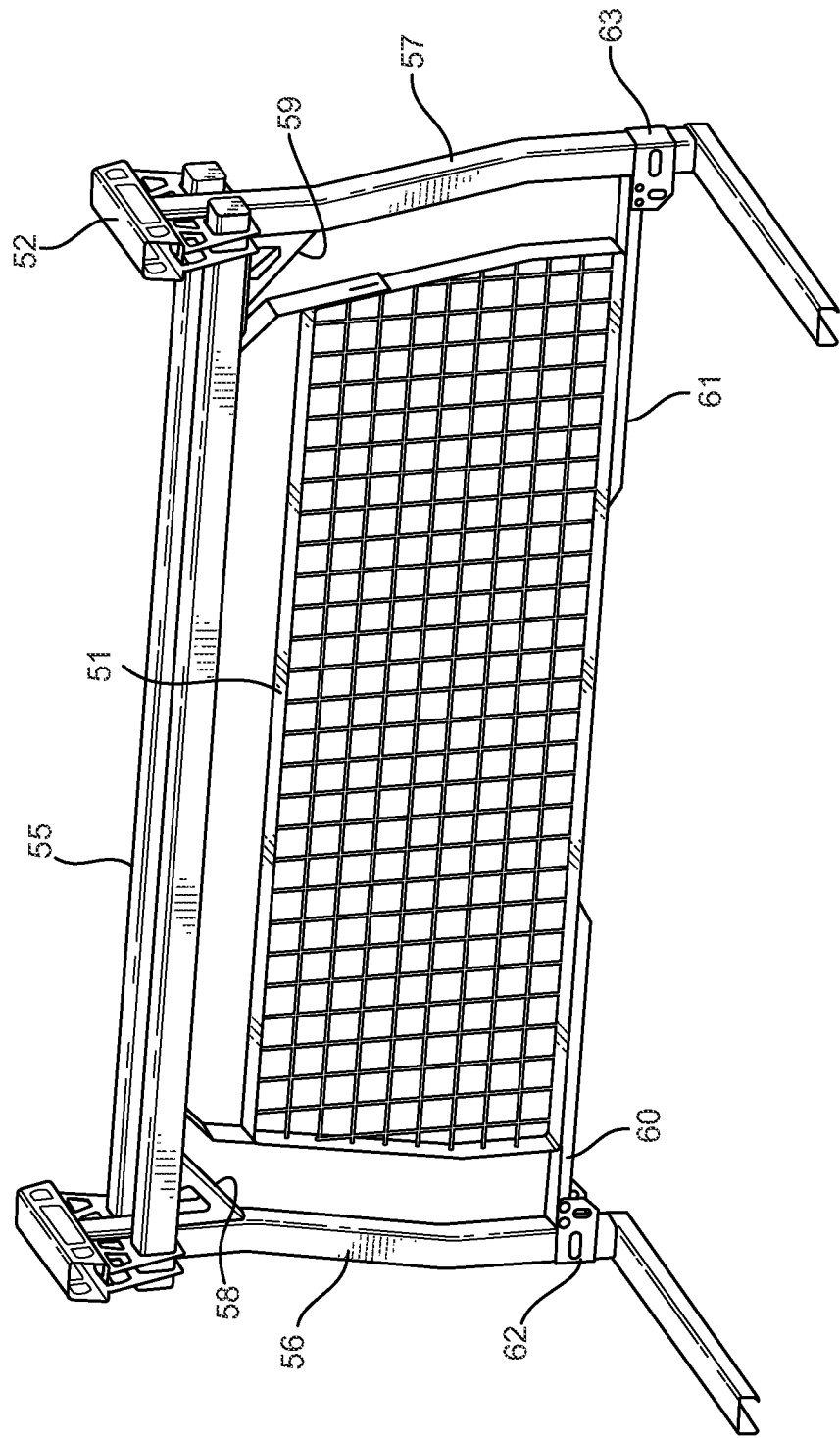
FIG. 17 is a perspective view of one embodiment of a full truck rack for interchanging screen members.

Referring to FIG. 17, there is depicted a rack frame having upper load bars 55 and upright members 56 and 57, which extend vertically and are essentially perpendicular to the truck bed. The Upper load bars 54 extend between the two upright members 55 and 56. Wedge members 58 and 59 are positioned in the corners between the upright members 56 and 57 and the upper load bars 55. As can be seen in FIG. 17, the upper load bars 55 are two parallel bars which extend across the upper portion of the rack. Because there are two load bars together, extra strength is provided when bearing a load.

Figure 18:
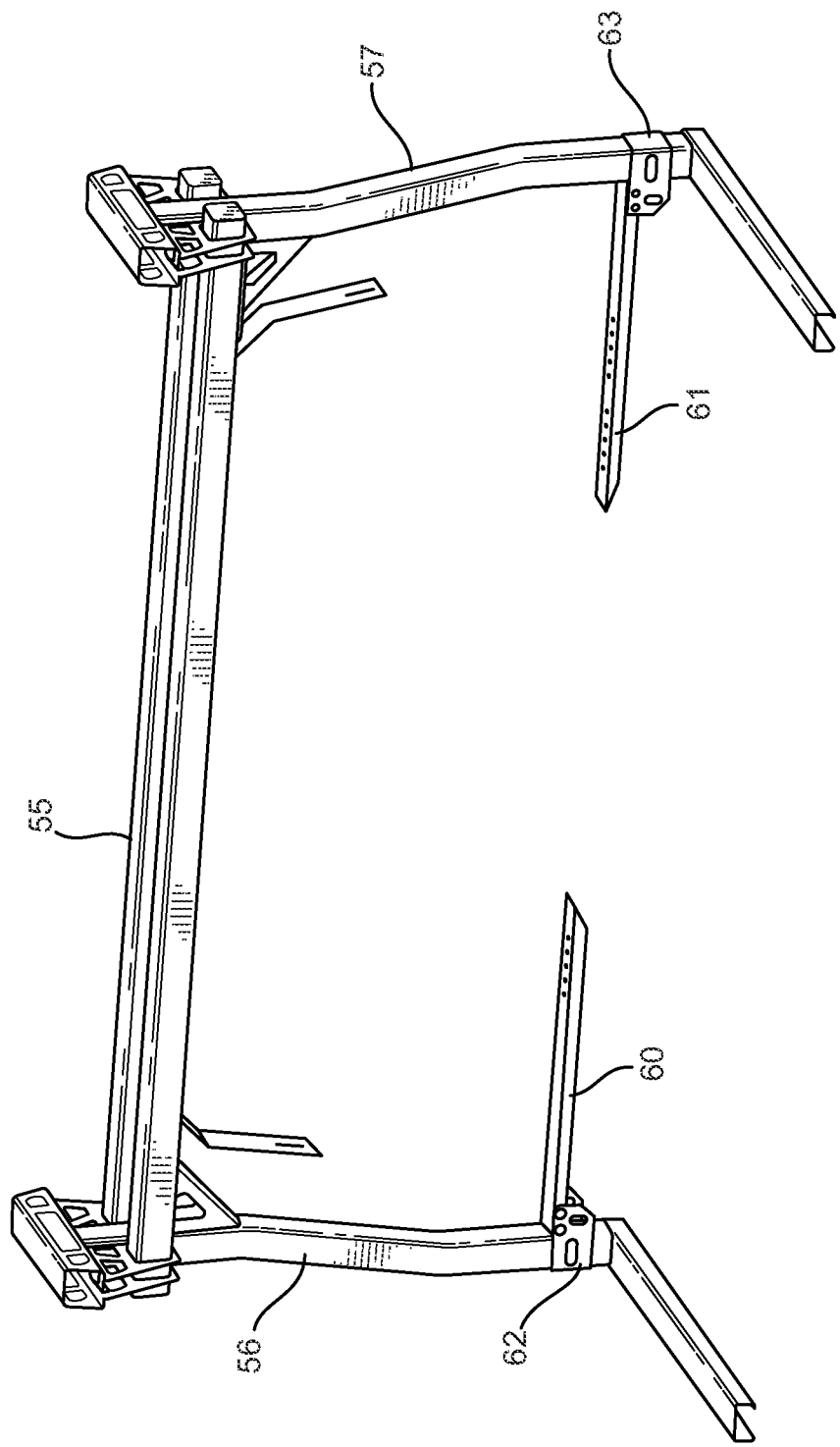
FIG. 18 is one embodiment of a full truck rack with the screen member removed.
Figure 18A:
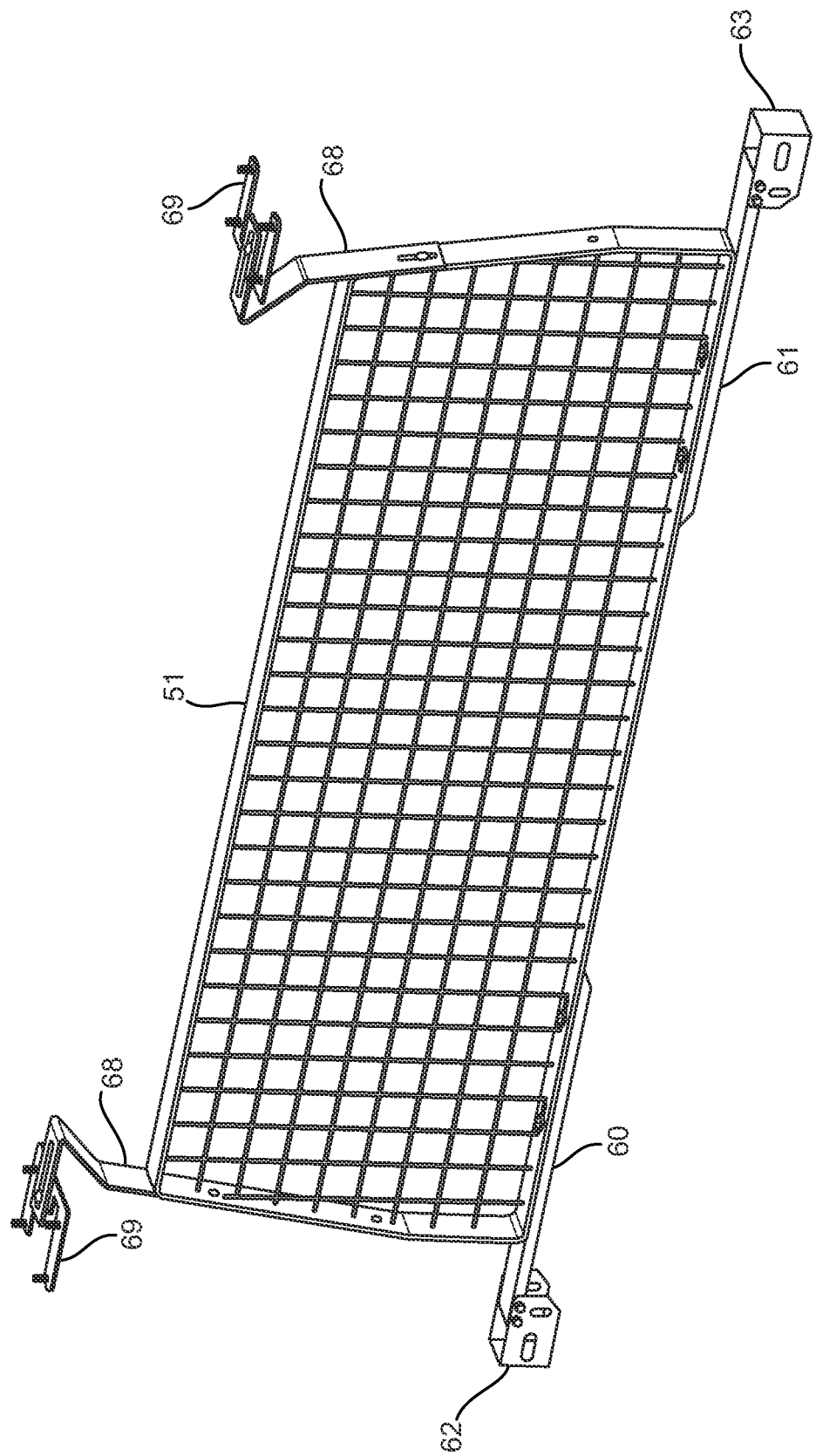
FIG. 18a is a perspective view of one embodiment of a screen member.

As can be further seen in FIG. 17, the mesh screen member 51 is mounted in the rack frame on top of inner extension mounts 60 and 61, which extend inward between the two upright members 56 and 57. Each are attached to the upright members by wrap around brackets 62 and 63. These component parts without a screen member mounted therein is shown in FIGS. 18 and 18a.

Figure 19:
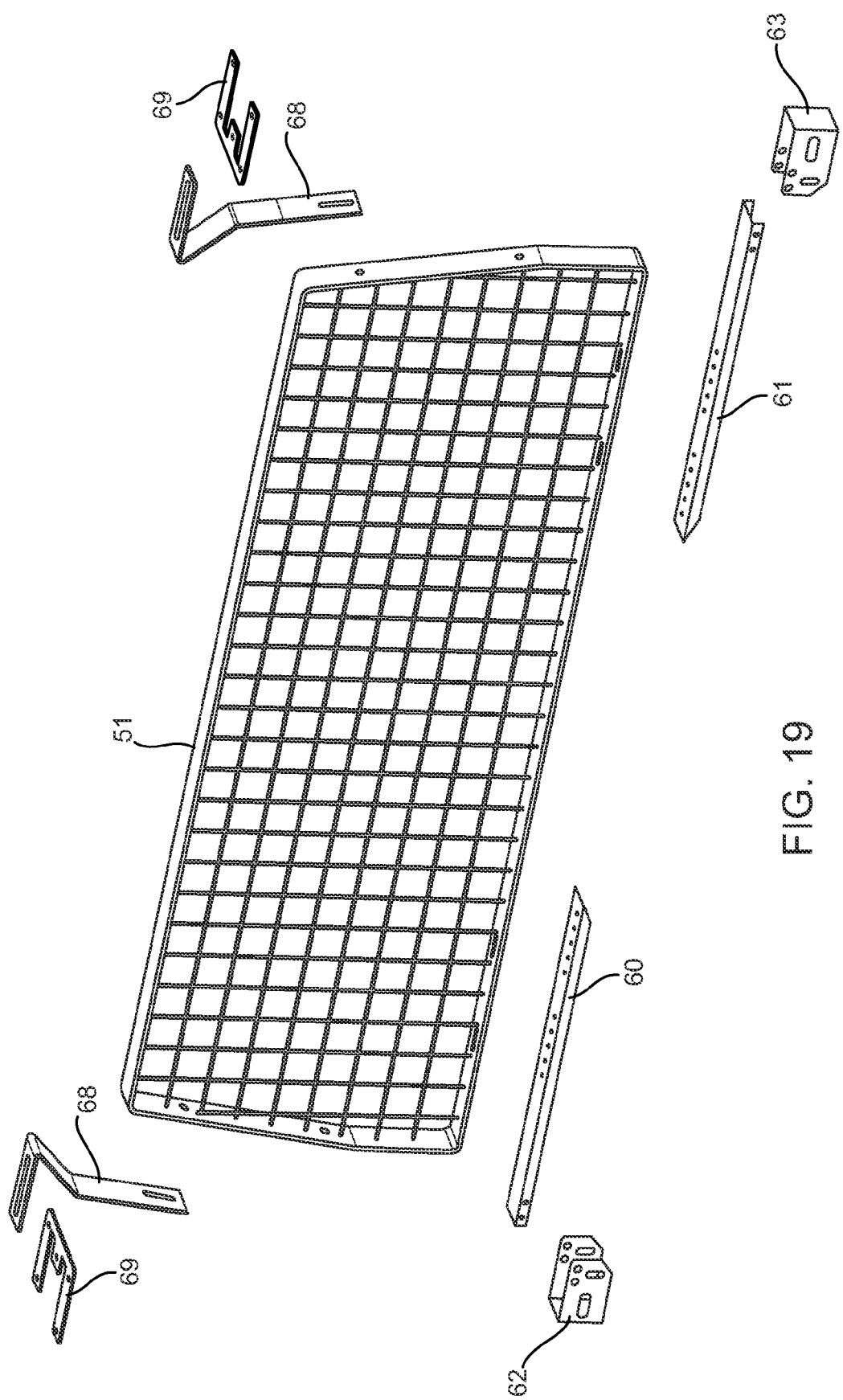
FIG. 19 is one embodiment of a disassembled full truck rack screen mount.
Figure 20:
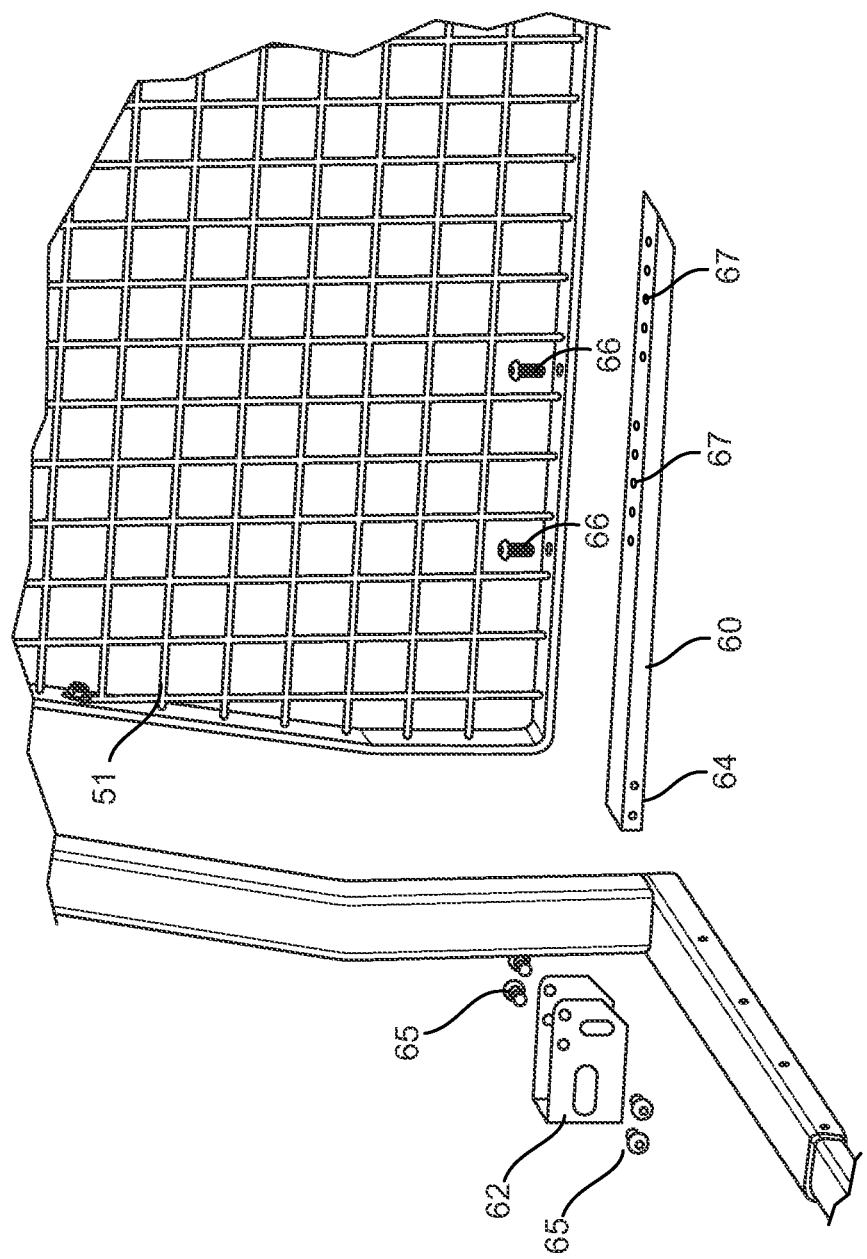
FIG. 20 is one embodiment of a disassembled inner extension mount.

As depicted in FIG. 19, the wrap around brackets 62 and 63 are generally U-shaped and cradle the side of the upright members. In other embodiments, the brackets may be shaped differently to correspond to the shape of the upright members. As further shown in FIG. 20, the inner extension mount 60 has apertures 64 on one end which will attach to the wrap around bracket 62 and be secured by fasteners 65. Furthermore, fasteners 66 are provided which will pass through apertures in the bottom rim 67 of the screen member 51 and into the inner member 60 to secure it thereto. In the same way the inner member 61 is attached to the wrap around bracket 63 and screen member 51.

Figure 21:
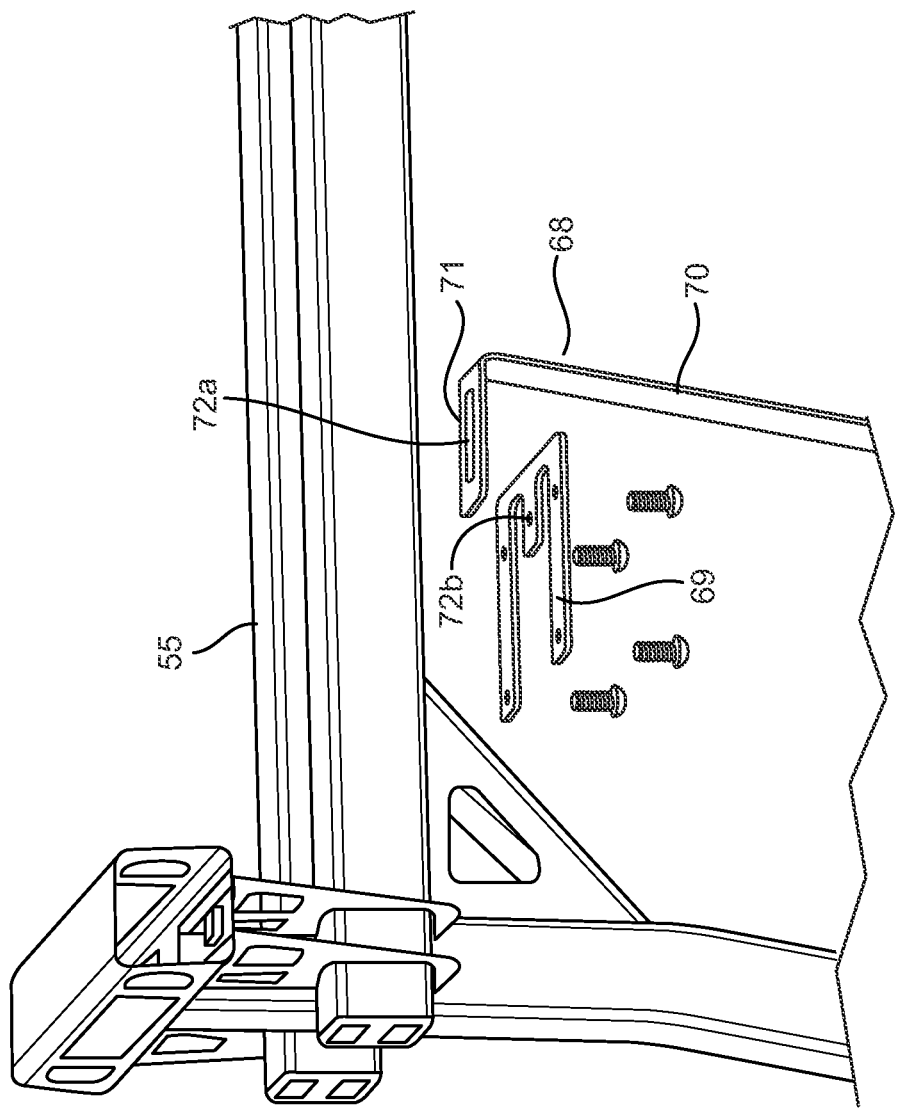
FIG. 21 is one embodiment of a disassembled W shaped bracket and arched bracket.

The attachment of the screen member 51 to the upper portion of the rack frame can be done using the assembly as shown in FIGS. 19, 21-24. Depicted in FIGS. 19 and 21, is arched bracket 68 and W-shaped attachment bracket 69. The arched shaped bracket 68 has a vertical lower portion 70 with an elongate slot for attachment to the screen member 51. This bracket further has an upper horizontal portion 71 having an elongate slot 72a for fastening onto the W shaped attachment bracket 69.

Figure 22:
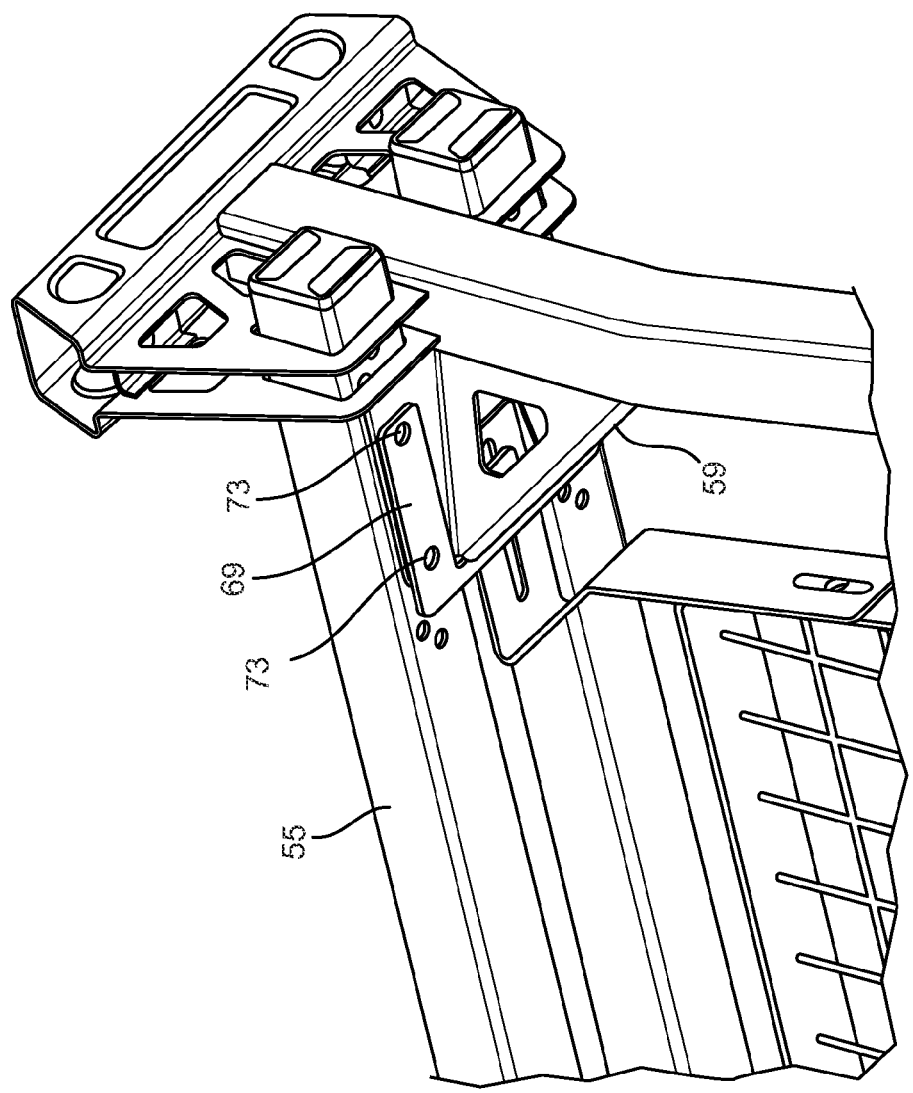
FIG. 22 is a perspective view one embodiment of a W shaped bracket attached to upper load bars.
Figure 23:
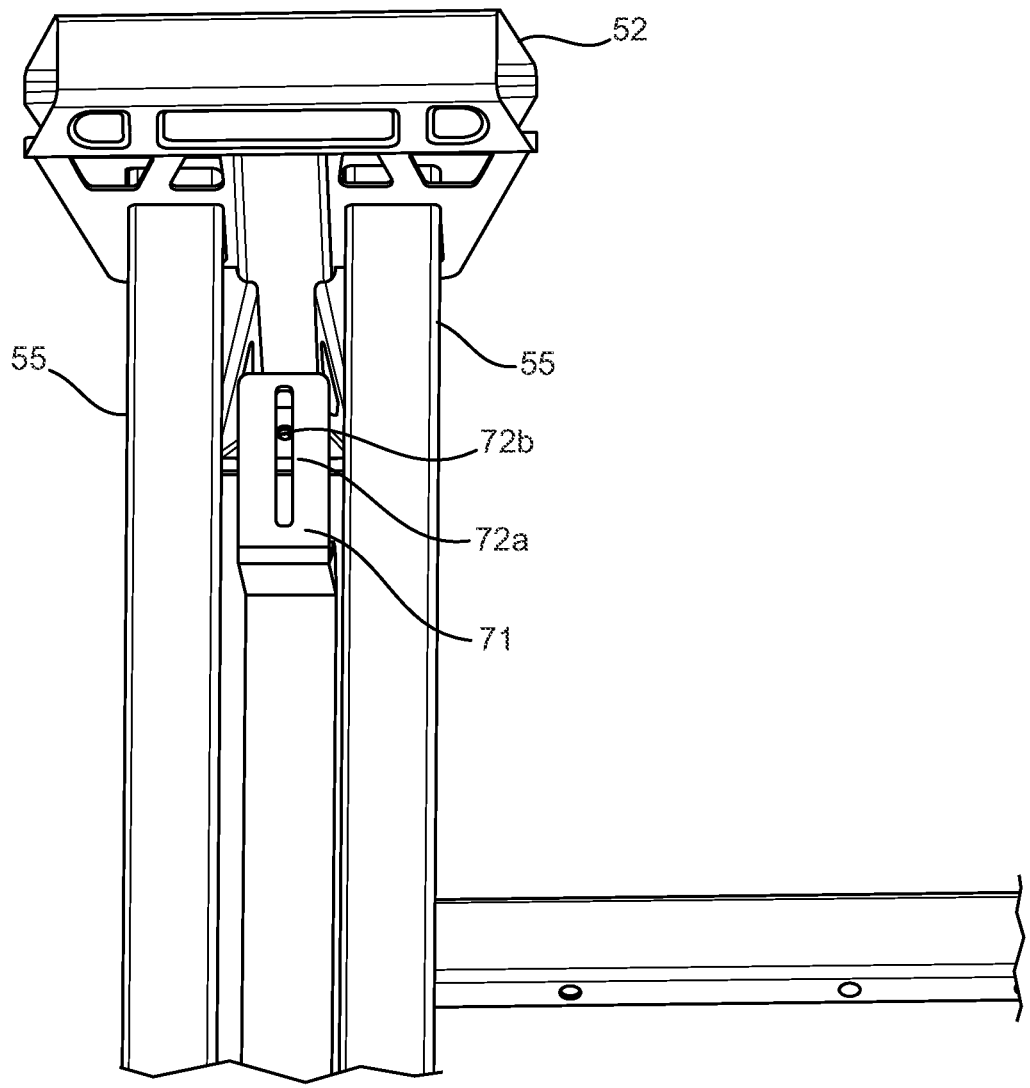
FIG. 23 is an overhead view of one embodiment of an arched bracket attached to a W shaped bracket.
Figure 24:
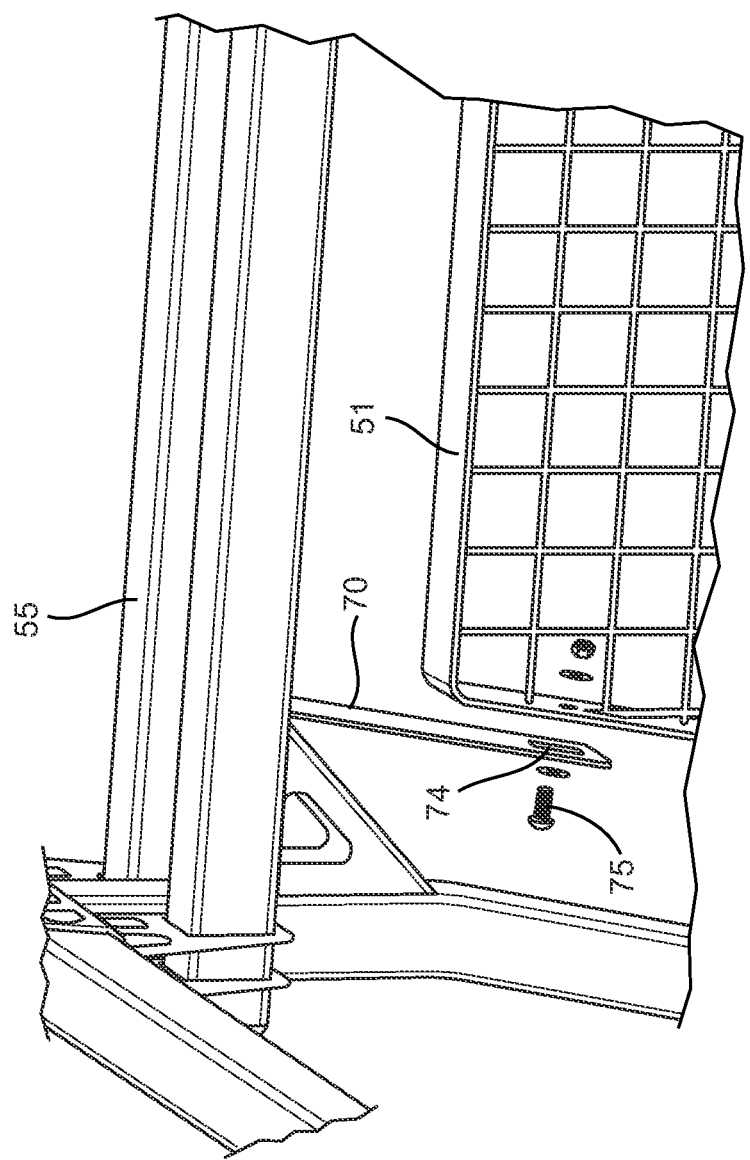
FIG. 24 is one embodiment of a disassembled arched bracket and screen member.

As depicted in FIG. 21, the W-shaped attachment bracket 69 will be fastened to the upper horizontal portion 71 at aperture 72b. As can be seen in FIG. 22, the W shaped bracket 69 will attach to the upper cross bars 55 through apertures 73. The wedge members 58 and 59 may have a flange portion extending across a portion of the upper cross bars 51, and therefore, the W shaped bracket 66 may attach to this flange portion as it is fastened to the upper cross bars 55. The W shaped bracket 69 is shaped such that it may fit around the wedge members 58 and 59. FIG. 23 shows the upper horizontal portion 71 fastened to the W shaped bracket 69 with the apertures 72a and 72b aligned. Furthermore, as depicted in FIG. 24, the lower vertical portion 71 has an aperture 74 which may be fastened to the screen member 51 with fastener 75.

The above described headache rack for the full truck rack provides additional flexibility to pick-up truck owners enabling them to switch between various screens quickly and easily. Moreover, the component parts can be sold separately by dealers thus broadening the capability to meet consumer needs.

Examples have been described above regarding various embodiments of a headache rack. One of ordinary skill in the art, however, will appreciate that various modifications to and departures from the disclosed embodiments will occur to those having skill in the art.

What is claimed is:

1. An adjustable width headache rack located behind the cab of a pickup truck for bearing loads, said rack being adjustable to accommodate the widths of multiple pickup truck vehicles, said rack comprising:

a frame member having an upper portion and a lower base portion, with said upper portion having an upper cross bar and said lower base portion having a lower cross bar, said lower and said upper cross bars each extending horizontally between two upright members;

said upright members being spaced a distance from one another and extending essentially perpendicular to a bed of said pickup truck;

said lower base portion of said frame having a leg member located on each end of the frame extending in a rearward direction of said pickup truck and arranged to rest atop bed rails of said pickup truck, and said leg members having a portion slidably engaged with said lower base portion of said frame, whereby said leg members are moveable inward and outward corresponding to the sliding of said portion along a length of said lower base portion for adjustment of a width of said frame to accommodate varying widths of multiple pickup trucks, wherein said slidably engaged portion comprises a sleeve portion which slides along said lower cross bar, said sleeve portion including a bottom surface and at least one side wall extending upward therefrom forming a slot configured to receive said lower cross bar, and wherein the sleeve has a first opening on a first end for receiving the lower cross bar when slidably along the lower cross bar and a second opening opposite said first end through which said lower cross bar exits when said sleeve is slid along said lower cross bar.

2. The adjustable width headache rack of claim 1, wherein the sleeve portion further includes a cover extending horizontally from said at least one side wall, enabling said sleeve portion to encircle said lower cross bar when said lower cross bar is received in said formed slot.

3. The adjustable width headache rack of claim 2, wherein said sleeve portion partially or fully encloses said cross bar.

4. The adjustable width headache rack of claim 2, wherein said sleeve portion of said leg members slides along an outside portion of said lower base portion.

5. The adjustable width headache rack of claim 2, wherein the cover covers only a portion of the sleeve thus forming an indention for receiving one of the upright members when said sleeve is slid onto said lower cross-bar, and said second opening is formed by the cover and at least one side wall extending upward from the bottom surface.

6. The adjustable width headache rack of claim 1, wherein said leg members further comprise a stake pocket mount extending in a downward direction for being received by a stake pocket.

7. The adjustable width headache rack of claim 1, wherein said leg members comprise an elongate slot along a longitudinal length of said leg member whereby said stake pocket mount may be fastened in multiple positions for accommodating varying stake pocket positions of multiple pickup trucks.

8. The adjustable width headache rack of claim 1, wherein said upright members comprise fastening apertures for removably inserting multiple protective screen members.

9. A headache rack assembly kit for being located behind the cab of a pickup truck for interchanging a plurality of screen members, said rack comprising:

a frame member having an upper portion and a lower base portion, with said upper portion having an upper cross bar and said lower base portion having a lower cross bar, said lower and said upper cross bars each extending horizontally between two upright members;

said upright members being spaced a distance from one another and extending essentially perpendicular to a bed of said pickup truck;

said lower base portion of said frame having a leg member located on each end of said frame extending in a rearward direction of said pickup truck and arranged to rest atop bed rails of said pickup truck; and said leg members having a portion slidably engaged with said lower base portion of said frame, whereby said leg members are moveable inward and outward corresponding to the sliding of said portion along a length of said lower base portion for adjustment of a width of said frame to accommodate varying widths of multiple pickup trucks, wherein said slidably engaged portion comprises a sleeve portion which slides along said lower cross bar, said sleeve portion including a bottom surface and at least one side wall extending upward therefrom forming a slot configured to receive said lower cross bar; and a plurality of screen members shaped for being arranged between and connected with said upright members, said plurality of screen members each being removably mountable between said upright members, and wherein the sleeve has a first opening on a first end for receiving the lower cross bar when slidably along the lower cross bar and a second opening opposite said first end through which said lower cross bar exits when said sleeve is slid along said lower cross bar.

10. A headache rack kit of claim 9, wherein said upright members having fastening apertures for fastening said plurality of screen members to said upright members.

11. A headache rack kit of claim 9, wherein said kit comprises spacer mounting blocks for fastening between said upright members and said screen members when screen members are mounted between said upright members.

12. A headache rack kit of claim 9, wherein said plurality of screen members comprise one or more from the group consisting of a mesh screen, high visibility screen, and louver screen.

13. A headache rack kit of claim 9, said kit further comprising:

leg members extending from said lower said portion of said frame each located on either end of said frame and extending in the rearward direction of said pickup truck and arranged to rest atop bed rails of said pickup truck, said leg members having a portion slidably engaged with said base portion of said frame, whereby said leg members are moveable inward and outward corresponding to the sliding of said portion along said length of said lower base portion for adjustment of said width of said frame to accommodate varying widths of multiple pickup trucks.

14. The headache rack kit of claim 9, wherein the sleeve portion further includes a cover extending horizontally from said at least one side wall, enabling said sleeve portion to encircle said lower cross bar when said lower cross bar is received in said formed slot, wherein the cover covers only a portion of the sleeve thus forming an indention for receiving one of the upright members when said sleeve is slid onto said lower crossbar.

15. A screen member assembly for a headache rack, said headache rack having a frame member having an upper portion and a lower base portion, with said upper portion having an upper cross bar, said upper cross bar extending horizontally between two upright members, said upright members being spaced a distance from one another and extending essentially perpendicular to a bed of the pickup truck, said assembly comprising:

one or more screen members;

leg members attachable to said upright members and extending between said upright members in the same longitudinal direction of said upper cross bar, said leg members configured for removably mounting said screen member thereon;

said leg members having a portion slidably engaged with said lower base portion of said frame, whereby said leg members are moveable inward and outward corresponding to the sliding of said portion along a length of said lower base portion for adjustment of a width of said frame to accommodate varying widths of multiple pickup trucks, wherein said slidably engaged portion comprises a sleeve portion which slides along said lower cross bar, said sleeve portion including a bottom surface and at least one side wall extending upward therefrom forming a slot configured to receive said lower cross bar, and wherein the sleeve has a first opening on a first end for receiving the lower cross bar when slidably along the lower cross bar and a second opening opposite said first end through which said lower cross bar exits when said sleeve is slid along said lower cross bar.

16. The assembly of claim 15, further comprising attachment clamps for attaching said screen member to said upper portion of said rack.

17. The headache rack kit of claim 15, wherein the sleeve portion further includes a cover extending horizontally from said at least one side wall, enabling said sleeve portion to encircle said lower cross bar when said lower cross bar is received in said formed slot, wherein the cover covers only a portion of the sleeve thus forming an indention for receiving one of the upright members when said sleeve is slid onto said lower crossbar.

18. A full headache rack for interchanging a plurality of screen members, said rack comprising:

a frame member having an upper portion and a lower base portion, with said upper portion having an upper cross bar, said upper cross bar extending horizontally between two upright members;

said upright members being spaced a distance from one another and extending essentially perpendicular to a bed of a pickup truck, leg members each attached to said upright members and extending therebetween in the same longitudinal direction of said upper cross bar, said leg members configured for removably mounting a screen member thereon; and said leg members having a portion slidably engaged with said lower base portion of said frame, whereby said leg members are moveable inward and outward corresponding to the sliding of said portion along a length of said lower base portion for adjustment of a width of said frame to accommodate varying widths of multiple pickup trucks, wherein said slidably engaged portion comprises a sleeve portion which slides along said lower cross bar, said sleeve portion including a bottom surface and at least one side wall extending upward therefrom forming a slot configured to receive said lower cross bar, and wherein the sleeve has a first opening on a first end for receiving the lower cross bar when slidably along the lower cross bar and a second opening opposite said first end through which said lower cross bar exits when said sleeve is slid along said lower cross bar.

19. The full headache rack of claim 18, further comprising attachment clamps extending from said screen member to said upper portion of said rack.

20. The headache rack kit of claim 18, wherein the sleeve portion further includes a cover extending horizontally from said at least one side wall, enabling said sleeve portion to encircle said lower cross bar when said lower cross bar is received in said formed slot, wherein the cover covers only a portion of the sleeve thus forming an indention for receiving one of the upright members when said sleeve is slid onto said lower crossbar.

* * * * *